United States Patent [19]

Suzuki et al.

[11] Patent Number: 5,532,913
[45] Date of Patent: Jul. 2, 1996

[54] ELECTRIC POWER SOURCE

[75] Inventors: Koji Suzuki; Toshiyuki Sekiya; Koji Doi, all of Yokohama, Japan

[73] Assignee: Canon Kabushiki Kaisha, Tokyo, Japan

[21] Appl. No.: 215,399

[22] Filed: Mar. 21, 1994

Related U.S. Application Data

[63] Continuation of Ser. No. 816,582, Jan. 3, 1992, abandoned.

[30] Foreign Application Priority Data

| Jan. 8, 1991 | [JP] | Japan | 3-000620 |
| Mar. 7, 1991 | [JP] | Japan | 3-041642 |
| Sep. 11, 1991 | [JP] | Japan | 3-231251 |

[51] Int. Cl.$^6$ ............................................. H02M 3/335
[52] U.S. Cl. ............................... 363/25; 363/26; 363/72; 363/97; 363/109
[58] Field of Search ......................... 363/16, 21, 25, 363/26, 65, 72, 74, 80, 97, 109, 133

[56] References Cited

U.S. PATENT DOCUMENTS

| 4,079,295 | 3/1978 | den Hollander | 315/411 |
| 4,327,404 | 4/1982 | Horiguchi | 363/19 |
| 4,727,463 | 2/1988 | Suzuki . | |
| 4,761,728 | 8/1988 | Takahashi | 363/126 |
| 4,791,528 | 12/1988 | Suzuki et al. | 361/258 |
| 4,791,544 | 12/1988 | Gautherin et al. | 363/49 |
| 4,866,587 | 9/1989 | Wadlington | 363/16 |
| 4,868,729 | 9/1989 | Suzuki | 363/21 |
| 4,958,268 | 9/1990 | Nagagata et al. | 363/16 |
| 4,962,307 | 10/1990 | Nakaya | 250/324 |
| 4,968,106 | 11/1990 | Ikeuchi | 315/411 |
| 4,980,811 | 12/1990 | Suzuji et al. . | |
| 4,996,638 | 2/1991 | Orr | 363/21 |
| 5,128,603 | 7/1992 | Wölfel | 323/282 |
| 5,173,847 | 12/1992 | Suzuki | 363/21 |

FOREIGN PATENT DOCUMENTS

| 0343392 | 11/1989 | European Pat. Off. . |
| 2021326 | 11/1979 | United Kingdom . |
| WO8901256 | 2/1989 | WIPO . |

*Primary Examiner*—Peter S. Wong
*Assistant Examiner*—Adolf Berhane
*Attorney, Agent, or Firm*—Fitzpatrick, Cella, Harper & Scinto

[57] ABSTRACT

An AC high-voltage power supply circuit, adapted for use in an image forming apparatus, for example in the separation charger of an electrophotographic copier, and capable of controlling the DC component of an AC high voltage, over a wide range including positive and negative regions. The power supply circuit includes, at the low voltage side of a secondary coil of an AC high-voltage transformer, a DC constant current circuit consisting of a transistor and a diode, a constant voltage circuit opposite in polarity to the DC constant circuit, and a detection circuit for detecting the DC component of a load current. The outputs of the constant voltage circuit and of the DC constant current circuit are controlled according to the output of the detection circuit. Such a device has a simple structure, provides a wider control range of the DC component including positive and negative regions, and has a lower power loss than previous power supply circuits.

20 Claims, 19 Drawing Sheets

ELECTRIC POWER SOURCE

This application is a continuation of application Ser. No. 07/816,582 filed Jan. 3, 1992, now abandoned.

BACKGROUND OF THE INVENTION

1. Field of the Invention

The present invention relates to a high voltage AC power supply circuit adapted for use in an image forming apparatus such as copying machine, printer or the like.

2. Related Background Art

In the conventional high-voltage AC power supply circuit for an image forming apparatus, a DC-DC converter circuit is inserted between a low voltage terminal and a ground terminal of a secondary coil of an AC high-voltage transformer in order to control the DC current in an AC charging wire of a separating charger constituting a load. Particularly if the control range of the DC current becomes wider and spreads from the positive to the negative side, there are required a DC-DC converter with a positive output and another DC-DC converter with a negative output.

FIG. 4 schematically show the basic structure of the above-mentioned conventional example, wherein shown are an AC high-voltage power source 21 including an AC high-voltage transformer; a DC-DC converter 22; an output terminal P1; a separating charger 23 constituting a load; and a direct current $i_{dc}$ required for an electrostatic sheet separation. The direct current $i_{dc}$ has to be in a direction opposite to the output of the DC-DC converter 22.

FIG. 5 is a circuit diagram of the DC-DC converter 22, wherein the primary DC input to a transformer T31 is chopped by a switching transistor TR31 controlled by an output control circuit 31, and the generated secondary output is rectified and smoothed by a diode D31 and a capacitor C31. The secondary rectifying circuit is further provided with a bleeder resistor R31.

FIG. 6 shows the voltage-current characteristic of the DC-DC converter 22, indicating the DC voltage $v_{dc}$ and the direct current $i_{dc}$ respectively in the ordinate and in the abscissa. FIG. 7 shows the voltage-current characteristic of the separating charger 23 receiving power supply from said high voltage AC power supply circuit, indicating the current i and voltage v respectively in the ordinate and in the abscissa. As shown in FIG. 7, the separating charger 23 has an apparently asymmetrical characteristic on the positive and negative sides, accepting more easily a current of the negative side.

In the above-explained structure and characteristics, the resistance of the breeder resistor R31 has to be made infinitely small, in order to bring the direct current $i_{dc}$ to 400 μA. For this reason the DC-DC converter 22 has to be of a high power type, which gives ride to the drawbacks of heat generation and a high cost.

If the control range of the direct current $i_{dc}$ is further spread from the limit of about zero in FIG. 6 to a positive area, it becomes necessary to serially insert a DC-DC converter 25 of a fixed output, with a polarity opposite to that of the variable-output DC-DC converter 22, as shown in FIG. 8. Since the control range of the direct current $i_{dc}$ on the load side becomes narrower by the output voltage of the fixed-output DC-DC converter 25, the output control range of the variable-output DC-DC converter 22 has to be accordingly widened, so that the power loss becomes even larger.

As explained in the foregoing, the DC-DC converter 22 requires a small resistance in the bleeder resistor R31 shown in FIG. 5, thus resulting in a significant power loss when the control range of the direct current $i_{dc}$ required for electrostatic sheet separation becomes wider. Also it requires a complex circuit structure.

SUMMARY OF THE INVENTION

In consideration of the foregoing, the object of the present invention is to provide an AC high-voltage power supply circuit, adapted for use in an image forming apparatus, and capable of controlling the DC component of the load current of a charger over a wide range from positive to negative side, with a simple structure and with a low power loss.

The above-mentioned object can be attained, according to an aspect of the present invention, by a structure comprising, on the low voltage side of a secondary coil of an AC high-voltage transformer, a DC constant current circuit consisting of a transistor and a diode, a constant voltage circuit connected in the opposite manner in polarity to the DC constant current circuit, and a load current detection circuit for detecting the DC component of the load current, wherein the output of the constant voltage circuit and that of the constant current circuit are controlled according to the output of the load current detection circuit.

According to another aspect, the above-mentioned object can be attained by the above-mentioned structure which is further featured by the fact that the constant voltage circuit includes a DC-DC converter, or by a fact that the constant voltage circuit includes a tertiary coil provided in the secondary side of the AC high-voltage transformer and a shunt regulator provided with the rectifying circuit, or by the fact that a certain difference is provided between the response speeds of the constant voltage circuit and of the constant current circuit.

The above-explained structures allow the control of the outputs of the constant voltage circuit and of the DC constant current circuit by the output of the load current detection circuit, whereby the DC component of the load current in the charger constituting the load can be varied over a wide range from the positive to the negative side.

The above-mentioned object can be attained, according to another aspect of the present invention, by dividing the output current into positive and negative components by a diode and controlling one of the components by a transistor, and, more specifically, by an AC high-voltage generating device comprising an AC high-voltage transformer; an output terminal provided at an end of a secondary coil of the transformer; a current control; circuit connected between the other end of the secondary coil and the ground and consisting of a serial circuit of a diode and a transistor, another diode directed opposite to the first-mentioned diode, and a resistor of a predetermined resistance, connected in parallel manner; a detection circuit for the DC component of the load current, and a control unit for controlling the transistor according to the output; of the detection circuit.

According to another aspect, the control unit is provided with a differential amplifier, and a power source for the differential amplifier, maintained in a floating state in such a manner that the operating current and output current of the differential amplifier do not flow into the detection circuit for the DC component of the load current.

According to another aspect, the control unit is provided with an emitter follower circuit, and a power source for the emitter follower circuit, maintained in a floating state in such a manner that the operating current and output current of the emitter follower circuit do not flow into the detection circuit for the DC component of the load current.

According to still another aspect, there are further provided a detection circuit for the AC component of the load current, and a circuit for deactivating the primary coil of the high-voltage transformer when the output of said detection circuit exceeds a predetermined value.

According to still another aspect, the power source in the floating state utilizes a rectified and smoothed output of a tertiary coil provided in the high-voltage transformer.

According to still another aspect, the power source in the floating state utilizes a double-voltage rectified output of an AC voltage obtained by an oscillator circuit.

According to still another aspect, the transistor is a field effect transistor.

In the above-mentioned configurations, the positive and negative components of the output current respectively pass through different diodes in the current control circuit, and one of said components is controlled by the transistor. The use of power source in floating state enables exact detection of the load current. Also the high-voltage transformer is deactivated when the AC component Of the load current exceeds a predetermined value. Furthermore, the use of a field effect transistor enables exact detection of the load current, without the power source in floating state.

The above-mentioned object can be furthermore attained, according to another aspect of the present invention, by an AC high-voltage power supply circuit, adapted for use in an image forming apparatus, comprising a current control circuit consisting of a serial circuit of a diode and plural transistors, another diode directed opposite to the first-mentioned diode, and a resistor the resistance of which is larger by a predetermined value than the difference between the positive and negative pseudo equivalent resistances of the charger constituting the load, all connected between the secondary coil of a high-voltage transformer and the ground, and further comprising a detection circuit for the DC component of the load current and control means for controlling the base current of a transistor in the current control circuit according to the output of said detection circuit.

The above-explained configuration divides the secondary high-voltage current of the high-voltage transformer into positive and negative DC currents by means of diodes, and controls the DC component of the load current by the current control circuit inserted into one of the divided currents.

Also the DC component of the load current can be controlled over the positive and negative ranges, since the resistance connected parallel to the current control circuit is larger than the difference of the positive and negative pseudo resistances of the load charger.

For achieving a wide-range control on the DC component of the load current, the output voltage of a serial regulator in the current control circuit has to be variable over a wide range. In the above-explained configuration, the voltage is divided among plural transistor in a serial circuit constituting the serial regulator, so that the voltage is not limited by the breakdown voltage of respective transistor. Thus the DC component of the load current of the charger can be controlled over a wide range from positive to negative side, through the control of base current of the transistors of the serial regulator according to the output of the detection circuit.

Other objects of the present invention, and the advantages thereof, will become fully apparent from the following description, which is to be taken in conjunction with the attached drawings.

DESCRIPTION OF THE PREFERRED EMBODIMENTS

Figure 1:
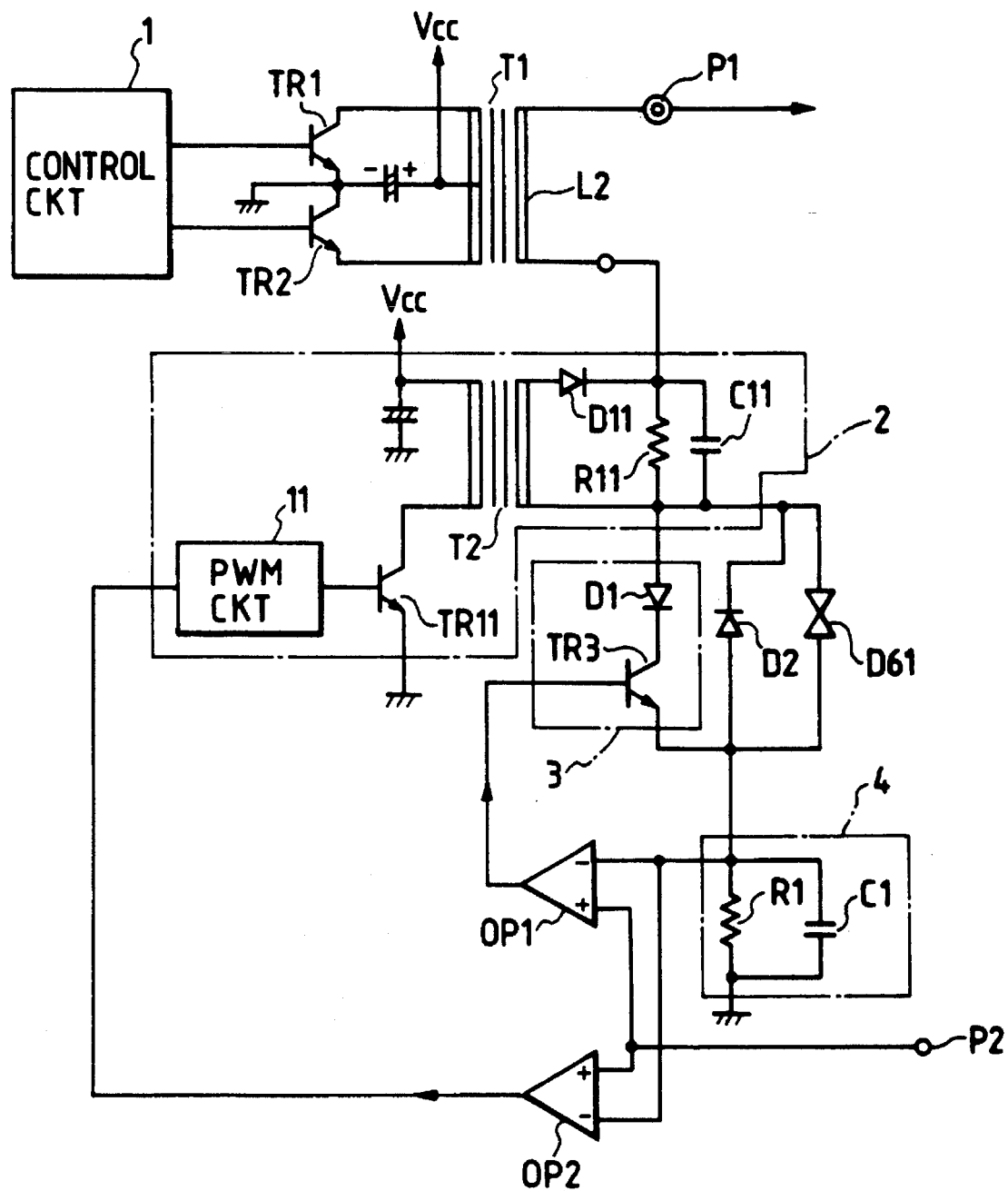
FIG. 1 is a circuit diagram of a first embodiment of the present invention.

FIG. 1 is a circuit diagram of an AC high-voltage power supply circuit, for electrostatic sheet separation in an electrophotographic copying machine, constituting a first embodiment of the present invention, wherein provided are an AC high-voltage transformer T1, and switching transistors TR1, TR2 for primary side drive, controlled by a control circuit 1 to provide a push-pull output. Output of a secondary 10 high-voltage coil L2 of the transformer T1 is supplied, through an output terminal P1, to a separating charger constituting the load.

A converter transformer T2 is provided for a constant voltage circuit, and a rectified positive output of the secondary side thereof is connected to the low voltage side of the secondary coil of the high-voltage transformer T1. The primary side of the converter transformer T2 is driven by a transistor TR11, and the output of the converter transformer T2 is controlled by regulation of the duty ratio of the collector current of the transistor TR11, through a pulse width modulation (PWM) circuit 11 connected to the base thereof. The secondary output of the transformer is rectified and smoothed by a diode D11 and a capacitor C11. A bleeder resistor R11 is connected parallel to the capacitor C11, and a constant voltage circuit 2 is constituted by the above-explained structure.

The low voltage side of the secondary coil of the converter transformer T2 of said constant voltage circuit is connected to the anode of a high-voltage diode D1 and the cathode of another high-voltage diode D2. The cathode of the high-voltage diode D1 is connected to the collector of a high-voltage transistor TR3, while the anode of the high-voltage diode D2 is connected to the emitter of the high-voltage transistor TR3. A diode varistor D61 is connected parallel to the high-voltage diode D2, for the purpose of circuit protection.

Between the emitter of the high-voltage transistor TR3 and the ground, there is inserted a load current detection circuit 4, consisting of a resistor R1 and a capacitor C1, for detecting the DC component of the load current. Differential amplifiers OP1, OP2 compare the voltage detected by said detection circuit 4 with a reference voltage supplied to a terminal P2.

The output of the differential amplifier OP1 is supplied to the base of the high-voltage transistor TR3, thereby controlling the base current thereof in such a manner that the detection output of the detection circuit 4 becomes equal to the reference voltage at the terminal P2. Thus the high-voltage diode D1 and the high-voltage transistor TR3 constitute a DC constant current circuit 3 controlled by the detection output of the load current detection circuit 4.

The output of the differential amplifier OP2 is supplied to the PWM circuit 11, thereby controlling the secondary rectified output of the converter transformer T2 in such a manner that the detection output of the detection circuit 4 becomes equal to the reference voltage at the terminal P2. Thus the output of the constant voltage circuit 2 is controlled by the detection output of the load current detection circuit 4.

During an increase in the collector current of the high-voltage transistor TR3, the outputs of the differential amplifiers OP1 and OP2 respectively become positive and negative, thus reducing the rectified output of the converter transformer T2, so that the dynamic range in the negative side of the load current does not become narrower.

Also during a decrease in the collector current of the high-voltage transistor TR3, the outputs of the differential amplifiers OP1, OP2 respectively become negative and positive, thus increasing the rectified output of the converter transformer T2, so that the dynamic range in the positive side of the load current does not become narrower.

In comparison with conventional structures, the above-explained configuration enables the varying of the DC component of the load current of the charger over a wider range from positive to negative side, with a higher efficiency and a reduced heat loss, and without the use of a power device or a heat sink. Also the circuit is protected from shortcircuiting of the load, resulting, for example, from the breakage of charging wires, and is therefore capable of preventing the accidental production of fire or smoking resulting from spark leaking. Furthermore, the load current can be very easily controlled, since the serially connected DC constant current circuit and constant voltage circuit are not controlled independently but simultaneously by the voltage detected by the load current detection cricuit 4.

Figure 2:
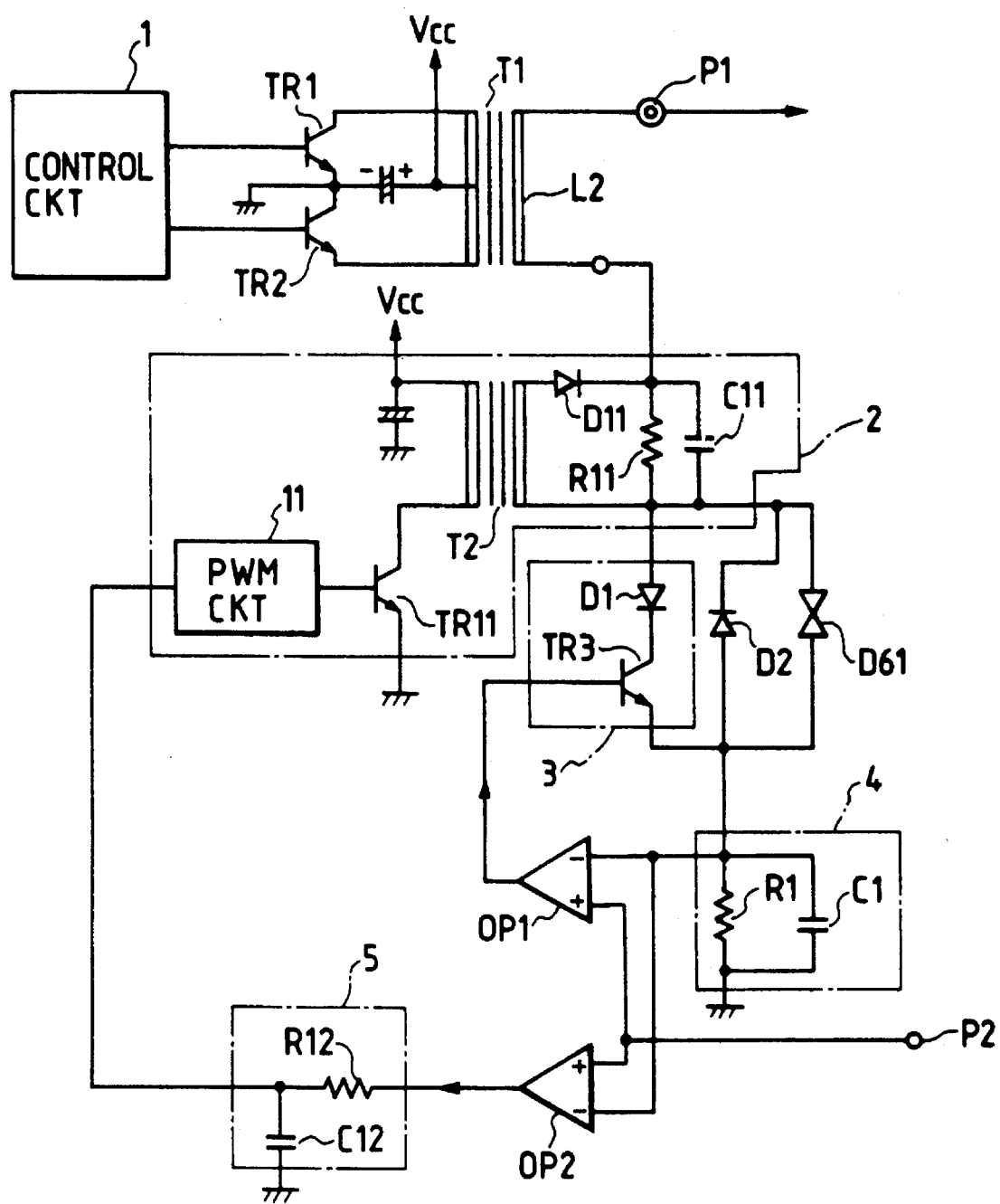
FIG. 2 is a circuit diagram of a 2nd embodiment.
Figure 3:
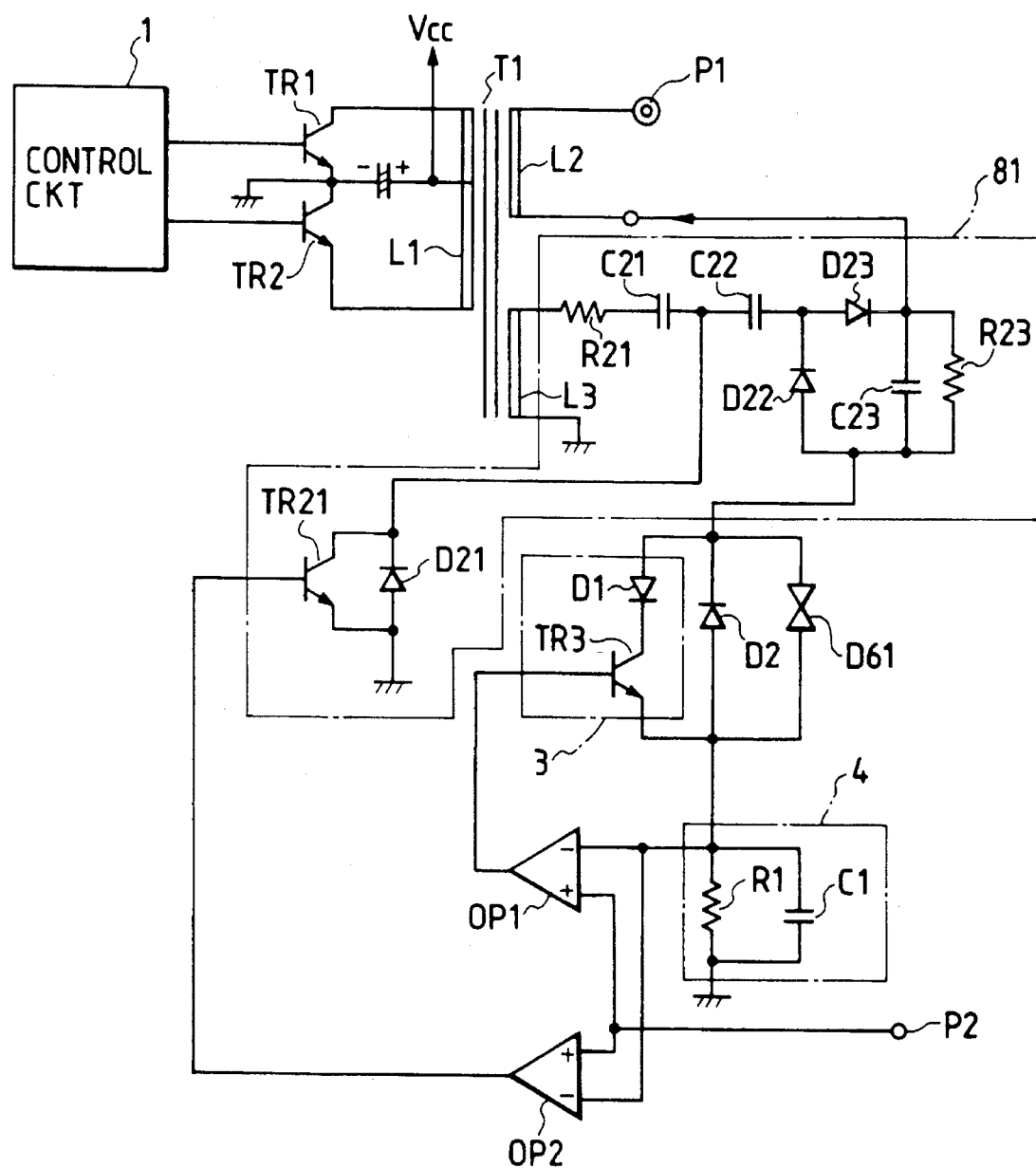
FIG. 3 is a circuit diagram of a 3rd embodiment.
Figure 4:
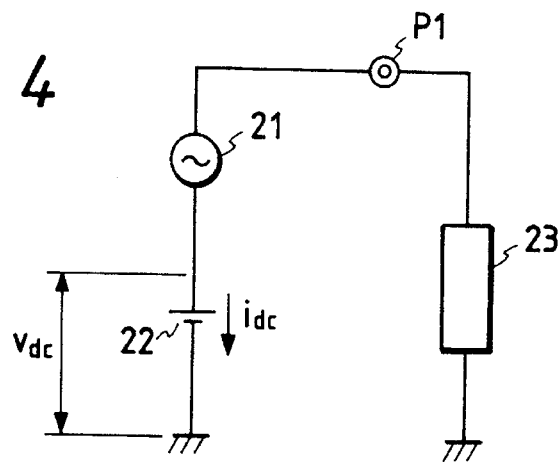
FIG. 4 is a schematic diagram of the basic structure of conventional circuits.
Figure 5:
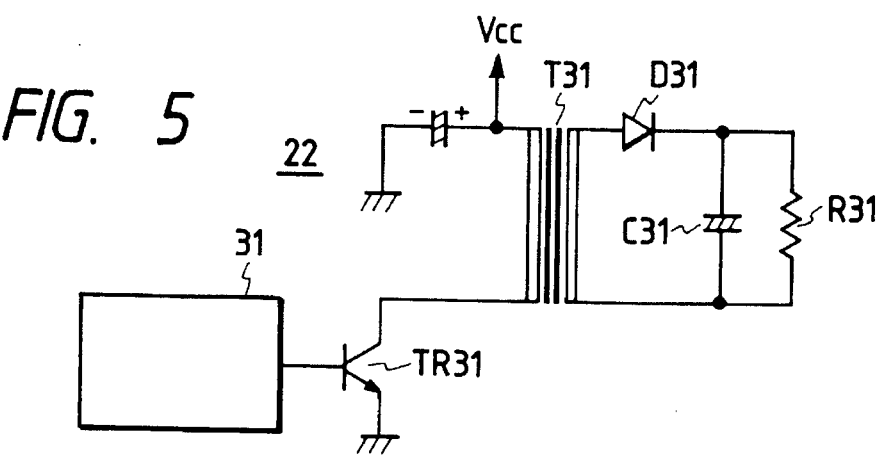
FIG. 5 is a circuit diagram of a DC-DC converter in the conventional circuit.
Figure 6:
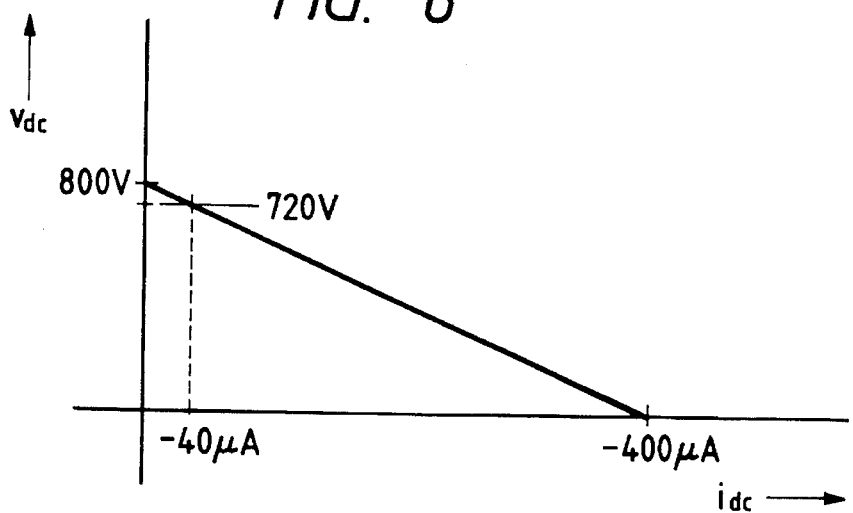
FIG. 6 is a voltage-current characteristic chart of the DC-DC converter in said conventional circuit.

FIGS. 2 and 3 are circuit diagrams showing other embodiments, wherein parts same as or equivalent to those in the foregoing embodiment are represent by the same symbols and will not be explained further.

In a 2nd embodiment shown in FIG. 2, an integrating circuit 5, consisting of a resistor R12 and a capacitor C12, is inserted between the differential amplifier OP2 and the PWM circuit 11, in order to render the response speed of the constant voltage circuit 2, including the converter transformer T2, slower than that of the DC constant current circuit 3 including the high-voltage transistor TR3, thereby improving the stability of circuit operation. The difference in the response speeds can be arbitrarily selected by the resistor R12 and the capacitor C12.

In a 3rd embodiment shown in FIG. 3, the constant voltage circuit involving the DC-DC converter shown in FIG. 1 is replaced by a tertiary coil L3 provided at the secondary side of the high-voltage transformer T1 and a shunt regulator 81 which constitutes a constant voltage circuit driven by the voltage generated in the tertiary coil L3 and is connected between the low voltage side of the high-voltage coil L2 of the high-voltage transformer T1 and the DC constant current circuit 3 consisting of the transistor TR3 and the diode D1. The shunt regulator 81 is provided with a rectifying circuit consisting of a diode D23 and a capacitor C23.

The output of the differential amplifier OP2 is supplied to the base of a transistor TR21 of the shunt regulator 81, and the collector current of the transistor TR21 is controlled by the output or the voltage detected by the load current detection circuit 4, whereby the output voltage of the shunt regulator 81, across the capacitor C23 and resistor R23, can be regulated. The output is supplied, as in the foregoing embodiments, to the low voltage side of the high-voltage coil of the AC high-voltage transformer T1.

When the input signal to the terminal P2 is increased, the output of the differential amplifier OP1 is elevated to increase the collector current of the transistor TR3 in the DC constant current circuit 3, thereby increasing the load current in the negative direction. At the same time the output of the differential amplifier OP2 is also elevated to increase the collector current of the transistor TR21 of the shunt regulator 81. The output of the tertiary coil L3 of the high-voltage transformer T1 is lowered at the junction between the transistor TR21 and the capacitor C21, because of the voltage drop in the serial impedance of the resistor R2 and the capacitor C21, so that the output of the shunt regulator 81, corresponding to the double of said output voltage, is also lowered. Of the other hand, when the input signal to the terminal P2 is lowered, the output of the shunt regulator 81 increases.

The output of the differential amplifier OP1 is supplied, as in the foregoing embodiments, to the base of the high-voltage transistor TR3 of the DC constant current circuit 3, which is thus controlled by the detection output of the detention circuit 4.

The above-explained configuration and function provide the effects similar to those in the embodiment shown in FIG. 1, without the use of a DC-DC converter.

These embodiments are applicable not only to the AC high voltage supply circuit for sheet separation but also to such circuit for supplying a developing bias voltage or for other purposes.

The 1st to 3rd embodiments explained above do not require a power device or a heat sink, since they are featured by a simple configuration with little power loss and without heat generation. Also since the serial connected DC constant current circuit and constant voltage circuit are not independently controlled but simultaneously by the output of the load current detection circuit, the load current can be very easily controlled and the DC component of the load current of the charger can be varied over a wide range, from positive to negative region.

In the following there will be explained still other embodiments.

[4th embodiment]

Figure 9:
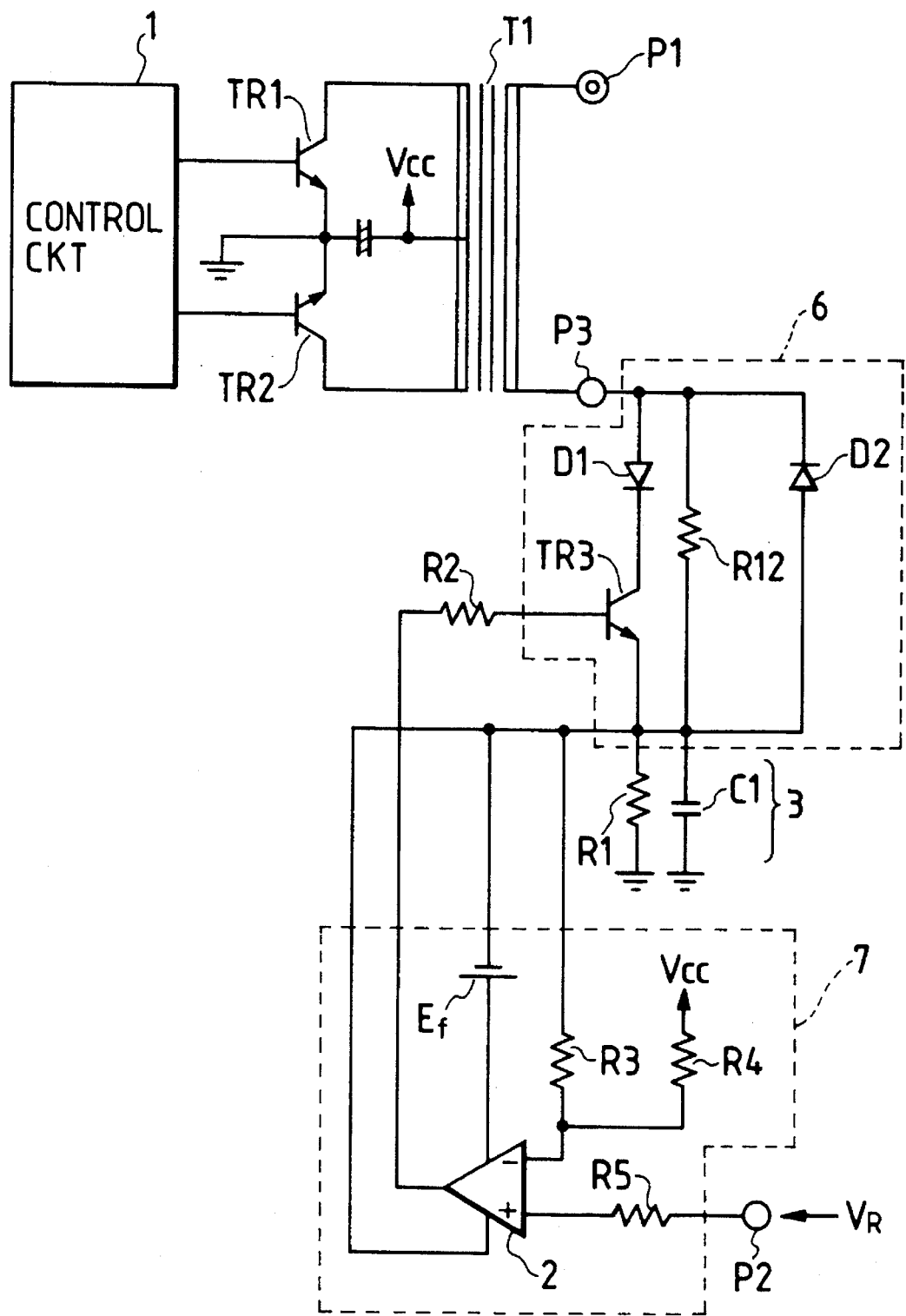
FIG. 9 is a circuit diagram of a 4th embodiment.

FIG. 9 is a circuit diagram of an AC high voltage generating device constituting a 4th embodiment of the present invention, wherein provided are an AC high-voltage transformer T1, switching transistors TR1, TR2 for primary side driving, and a push-pull output control circuit. The output of a high-voltage secondary coil of said high-voltage transformer T1 is supplied, through an output terminal P1, to an unrepresented separating charger constituting the load. The low voltage side P3 of the secondary coil of the high-voltage transformer T1 is connected to the anode of a high-voltage diode D1, the cathode of a high-voltage diode D2, and an end of a resistor R12. The cathode of the high-voltage diode D1 is connected to the collector of a high-voltage transistor Tr3, while the anode of the high-voltage diode D2 and the other end of the resistor R12 are connected to the emitter of said high-voltage transistor Tr3. The components D1, TR3, R12 and D2 constitute a current control circuit 6. Between the emitter of the high-voltage transistor TR3 and the group, there is inserted a detection circuit 3, consisting of a parallel circuit of a resistor R1 and a capacitor C1, for detecting the DC component of the load current. The resistor R1 and capacitor C1 obtain the average of the load current.

The voltage detected by the detection circuit 3 is compared with a reference voltage $V_R$ supplied to a terminal P2, in an error amplifier 2 in a control unit 7. The output of the error amplifier 2 serves to control the base current of the high-voltage transistor TR3 in such a manner that the detection output of the detection circuit 3 becomes equal to the reference voltage $V_R$ at the terminal P2.

The power for the error amplifier 2 is supplied by a power source Ef in floating state. As a line of the power source is connected to the emitter of the high-voltage transistor TR3, the base current thereof does not flow into the current detection circuit 3.

The value of the resistor R12 is determined in the following manner.

Figure 10:
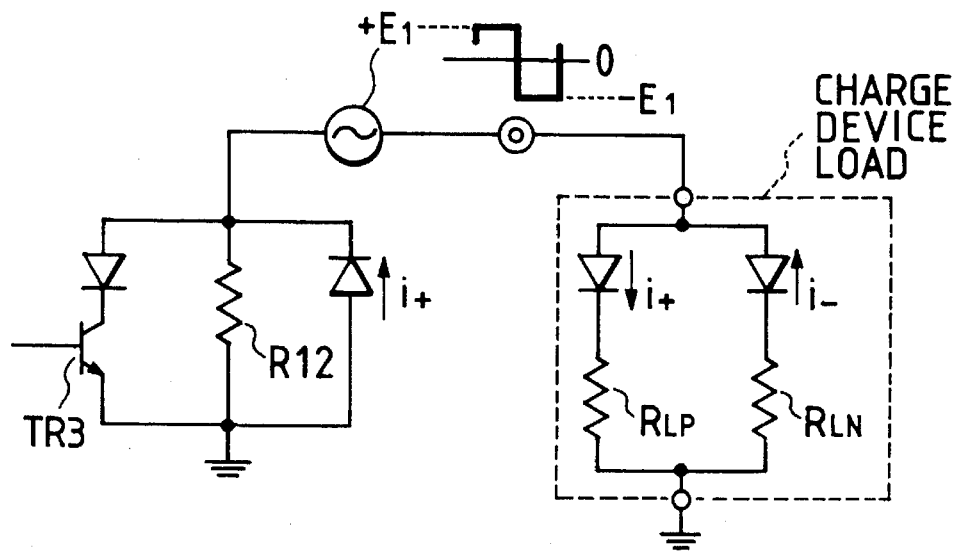
FIG. 10 is an equivalent circuit diagram of said 4th embodiment and a load charger.
Figure 11:
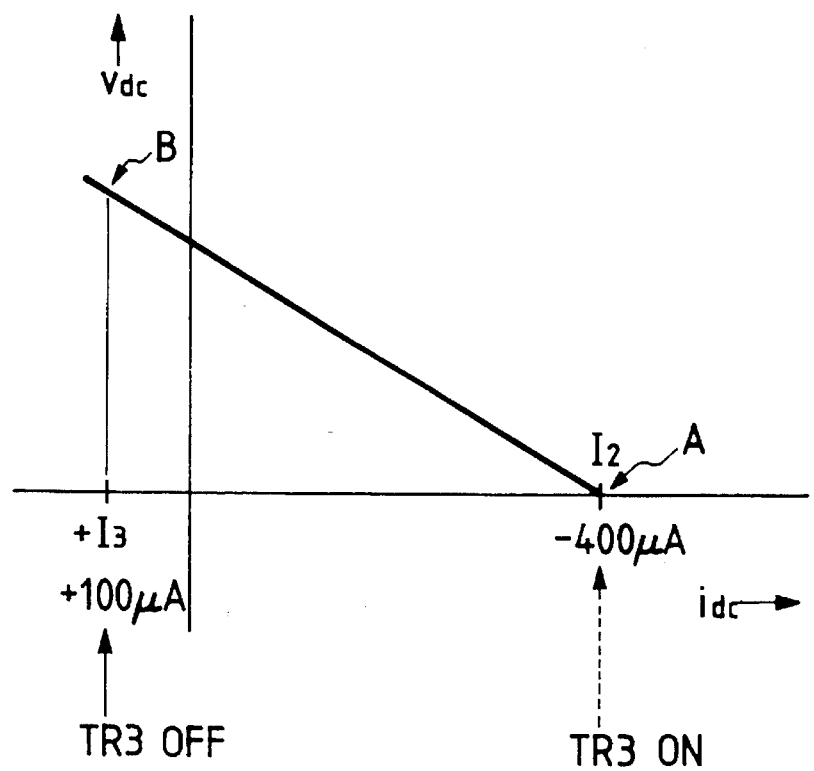
FIG. 11 is a chart showing the function of the 4th embodiment.

FIG. 10 is an equivalent circuit diagram of of the 4th embodiment shown in FIG. 9 and the charger constituting the load, and FIG. 11 is a voltage-current characteristic chart of the DC component (average of load current) of the current in the charger. Points A and B define the required control range of the DC component. The high-voltage transistor TR3 has to be turned on at the point A and off at the point B. Consequently, in the off-state of the high-voltage transistor TR3, the positive current has to be larger than the negative current by $I_3$. Thus:

$$V_1/R_{LP} - V_1(R_{LN}+R12) = I_3 \quad (1)$$

wherein:

$V_1$: ½ of amplitude of AC high-voltage output $R_{LP}$: positive pseudo equivalent resistance of charger $R_{LN}$: negative pseudo equivalent resistance of charger.

Thus, R12 can be determined from the equation in the following manner:

$$R12 = \frac{R_{LP}}{1-(I_3 R_{LP})/V_1} - R_{LN} \quad (2)$$

The output of the detection circuit 3 is shifted in level by resistors R3, R4, into the input dynamic range of the error amplifier 2. As the current in the resistors R, R4 also flows in the DC component detecting resistor R1, the resistances of R3, R4 have to be sufficiently large in order not to affect the accuracy of detection.

For a similar reason, the error amplifier 2 has to have a sufficiently large input impedance.

As explained in the foregoing, there can be obtained an AC high voltage generating device of a high efficiency, capable of controlling the DC current over a wide range covering positive and negative regions, without the use of a DC-DC converter. Since the error amplifier has a power source in floating state (hereinafter called floating power source), the DC component of the load current can be exactly detected.

[5th embodiment]

Figure 12:
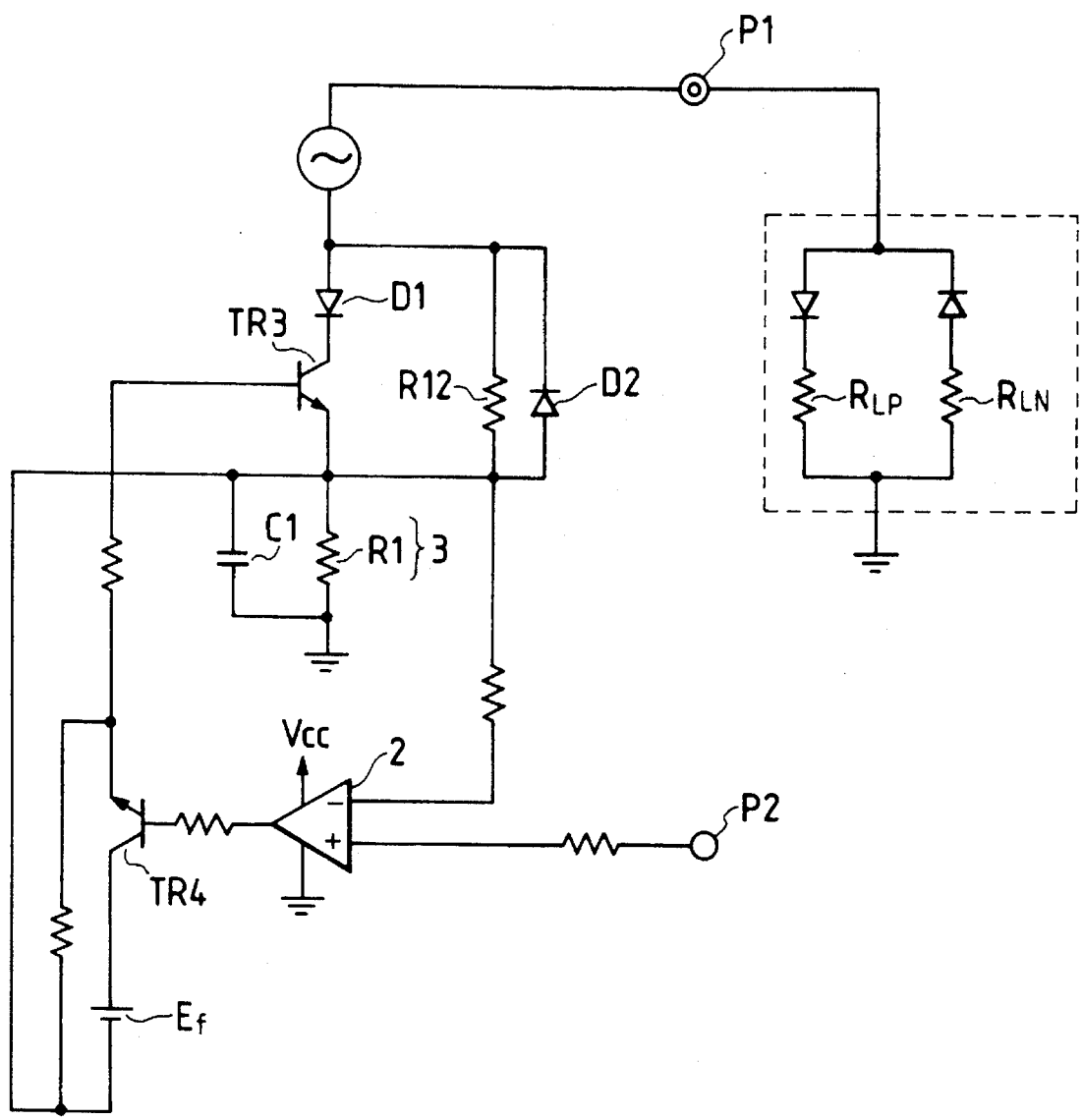
FIG. 12 is a circuit diagram of a 5th embodiment.

FIG. 12 is a circuit diagram of a 5th embodiment, in which the differential amplifier 2 is powered by a common power source $V_{cc}$, and a transistor TR4 of emitter follower connection ires inserted between the output of the error amplifier 2 and the base of the high-voltage transistor TR3. An output line of a floating power source Ef is connected to the collector of the emitter follower transistor TR4, while the other output line of the power source Ef is connected to the emitter of the high-voltage transistor TR3.

The present embodiment allows simplification of the floating power source, since it is only used for supplying the base current of the high-voltage transistor TR3.

During a positive cycle of the AC high voltage, a large current flows from the base to the Emitter of the high-voltage transistor TR3, since the base is positively biased though the high-voltage diode D1 is turned off. However the influence of the base current can be completely eliminated by the use of the floating power source.

[6th embodiment]

Figure 13:
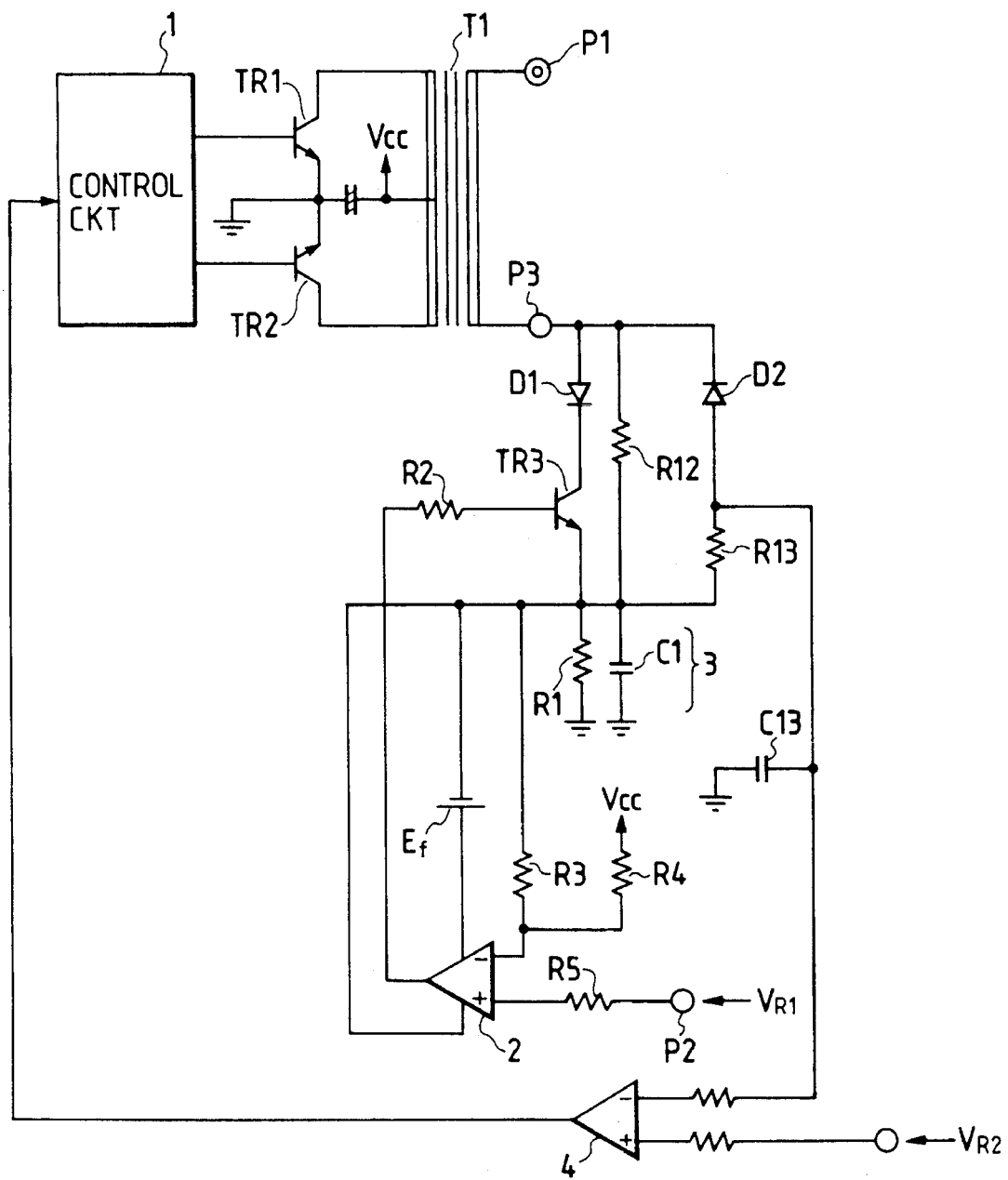
FIG. 13 is a circuit diagram of a 6th embodiment.

FIG. 13 is a circuit diagram of a 6th embodiment having a shortcircuiting protection circuit in the 4th embodiment.

If a shortcircuiting or a leak occurs in the load (charger) connected to the terminal P1, the output voltage of the AC high-voltage transformer T1 is applied between the collector and the emitter of the high-voltage transistor TR3.

In such situation, the embodiment shown in FIG. 9 may result in the destruction of the high-voltage transistor TR3, driving transistors TR1, TR2 for the AC high-voltage transformer T1, high-voltage diodes D1, D2 or resistor R12.

In the present 6th embodiment, between the anode of the high-voltage diode D2 for positive component bypassing and the DC component detection circuit 3, there is inserted an alternating current detection resistor R13, the detection output in which is compared by a comparator with a predetermined value $V_{R2}$. If the detection output exceeds the predetermined value, the comparator sends a high-level output signal to the control circuit 1 for the AC high-voltage transformer T1, thereby terminating the activation of the switching transistors TR1, TR2.

The 6th embodiment not only protects the circuit from shortcircuiting for example resulting from breakage of the charging wire but also can prevent fire or smoke generation by spark leaking. Also the alternating current detection for circuit protection from shortcircuiting is made possible without an additional rectifying circuit. Furthermore, the alternating current detection is made possible without affecting the precision of DC component detection in the load current.

[7th embodiment]

Figure 14:
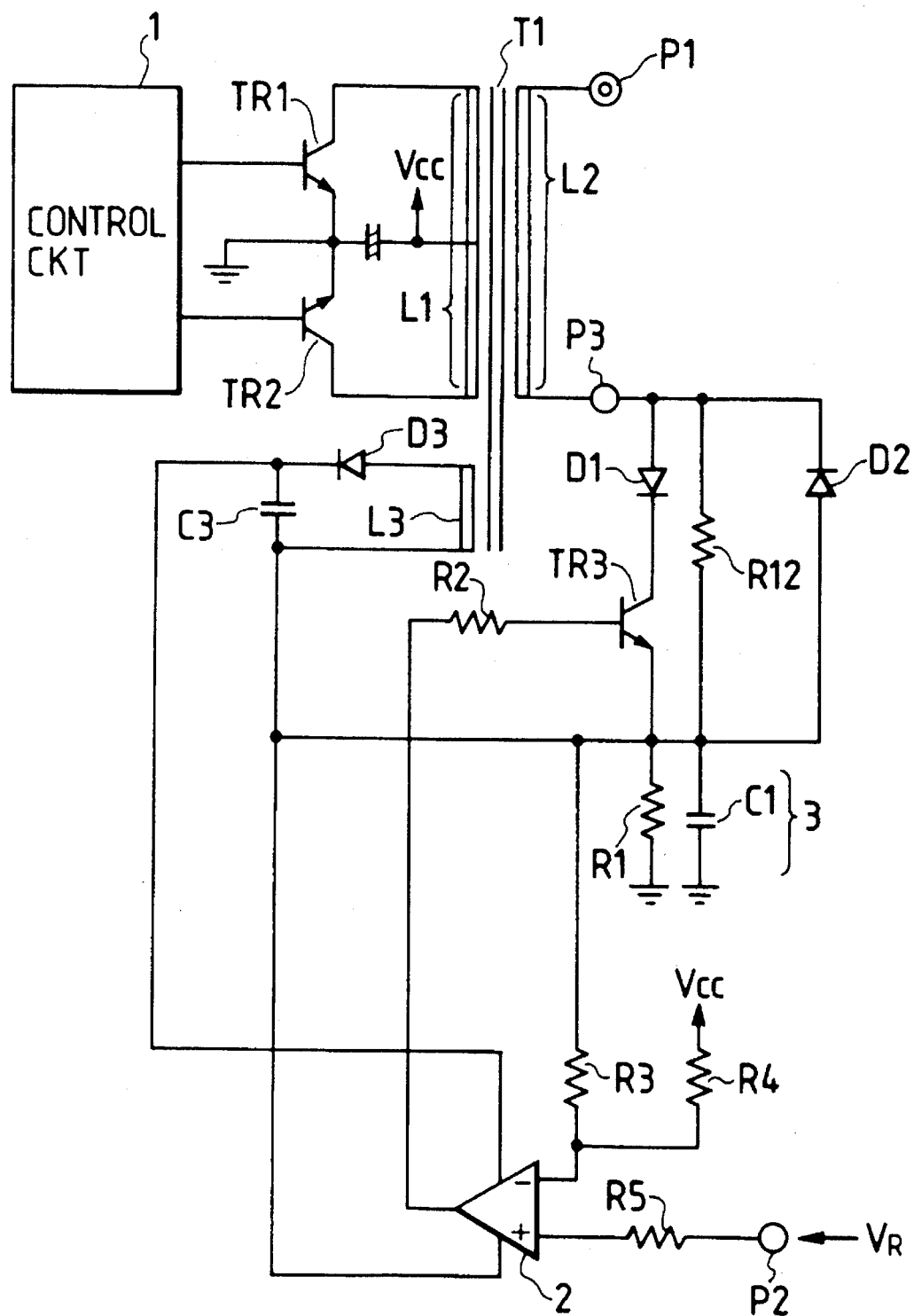
FIG. 14 is a circuit diagram of a 7th embodiment.

FIG. 14 is a circuit diagram of a 7th embodiment in which the floating power supply Ef is obtained by rectifying and smoothing the output voltage of a tertiary coil L3 provided on the AC high-voltage transformer T1.

[8th embodiment]

Figure 15:
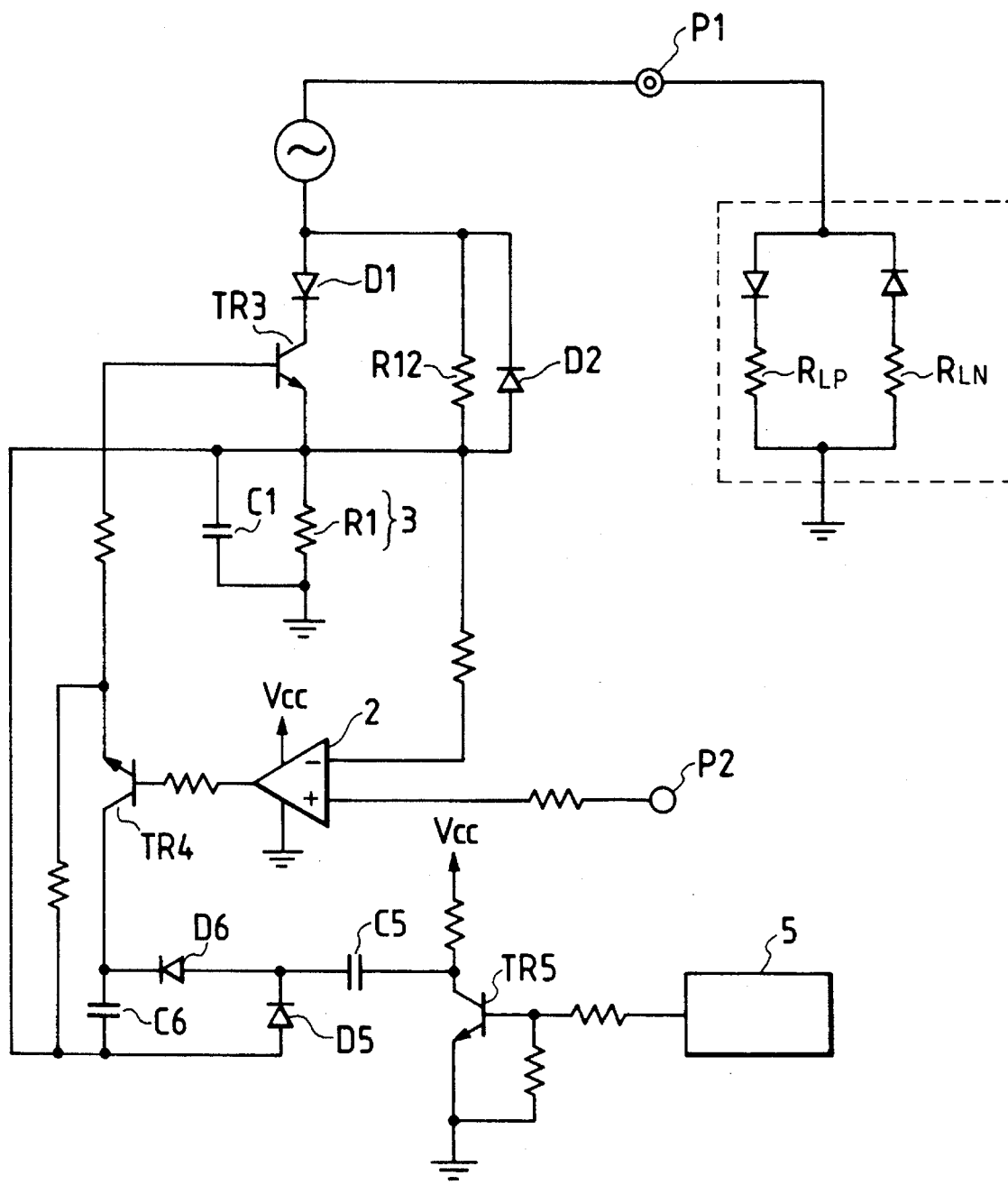
FIG. 15 is a circuit diagram of an 8th embodiment.

FIG. 15 shows an 8th embodiment in which the floating power supply Ef is obtained by switching a transistor TR5 with the output of ah oscillator circuit 5, and effecting double-voltage rectification on the switched output with capacitors C5, C6 and diodes D5, D6.

[9th embodiment]

Figure 16:
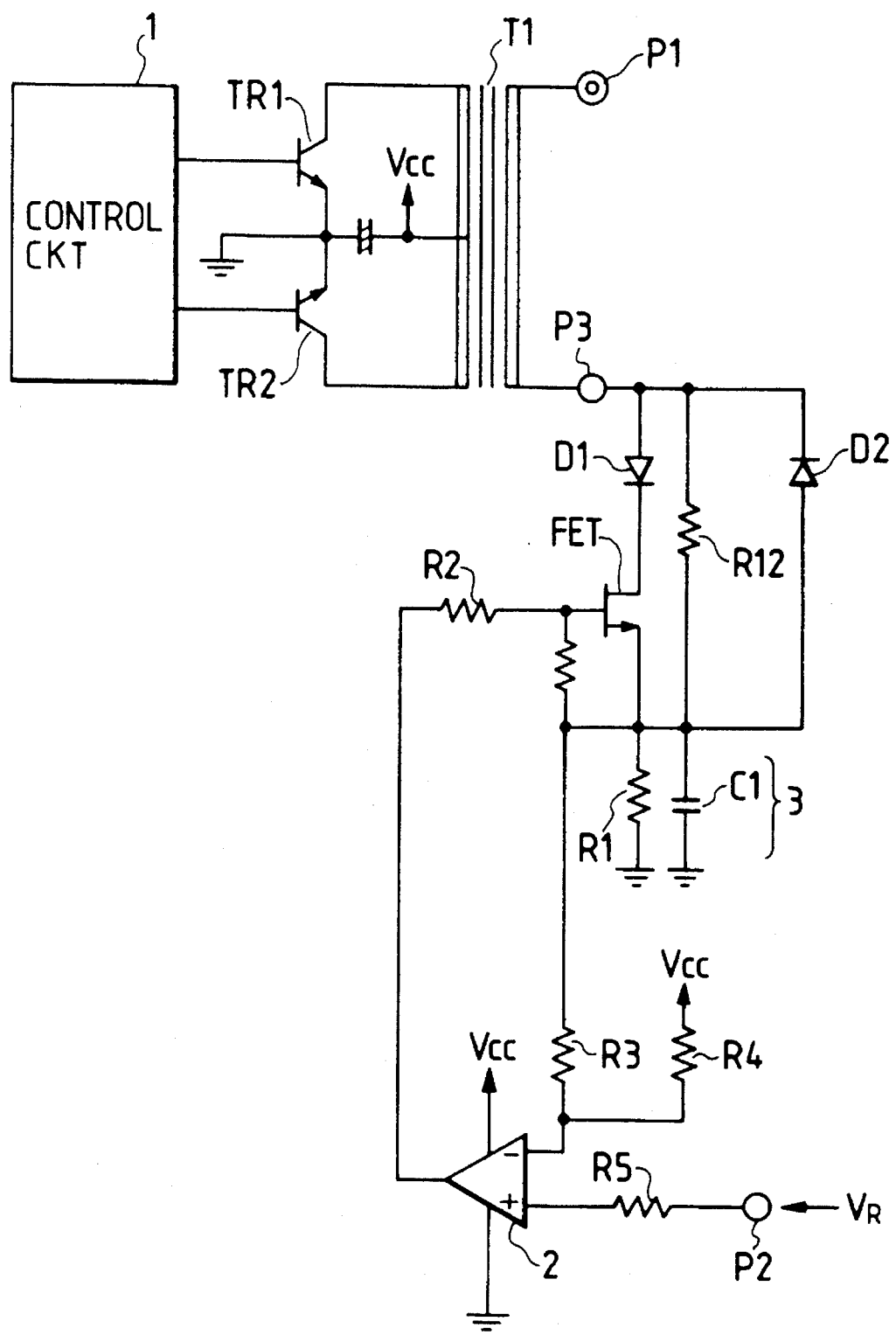
FIG. 16 is a circuit diagram of a 9th embodiment.

FIG. 16 shows a 9th embodiment employing a high-voltage field effect transistor (FET) instead of the high-voltage bipolar transistor TR3.

The 9th embodiment dispenses with the floating power source and allows to simplification of the circuit structure, because of the absence of current leak from the gate circuit of FET, based on the high input impedance thereof.

The 4th to 9th embodiments explained above provide an AC high-voltage generating device of a high efficiency, capable of controlling the direct current over positive and negative regions, without the use of a DC-DC converter Also the DC component of the load current can be exactly detected by the use of a floating power source.

It is furthermore possible, not only to protect the circuit itself but also to prevent the generation of fire or smoke in the load, resulting from spark leaking, by detecting an excessive AC component in the load current voltage transformer.

Furthermore, the floating power source may be dispensed with by the use of a field effect transistor in the current control circuit.

In the following there will the explained still other embodiments.

[10th embodiment]

Figure 7:
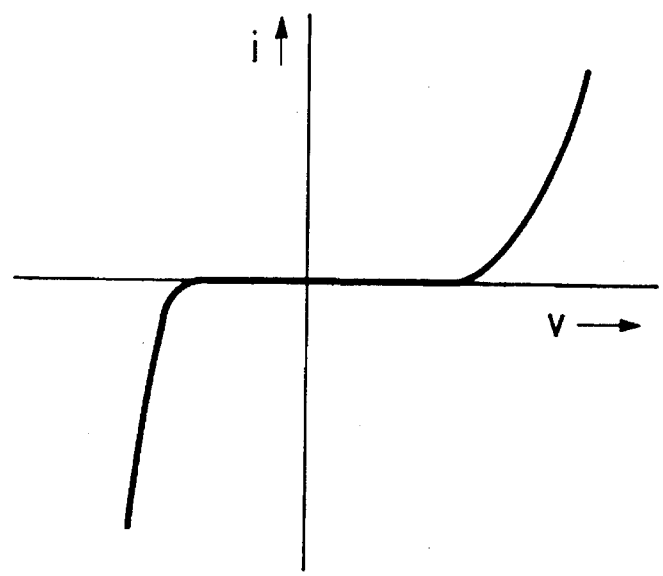
FIG. 7 is a voltage-current characteristic chart of a separating charger constituting a load for the AC high-voltage power supply circuit.
Figure 8:
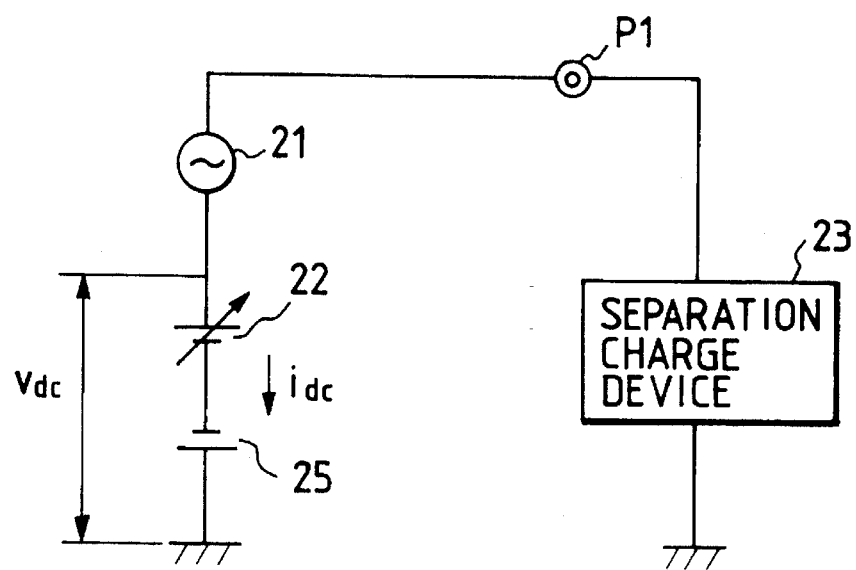
FIG. 8 is a schematic diagram of a circuit including an additional fixed-output DC-DC converter.

FIG. 7 is a circuit diagram of an AC high-voltage generating circuit, adapted for electrostatic sheet separation in an electro-photographic copying apparatus, constituting a 10th embodiment of the present invention, wherein provided are an AC high-voltage transformer T1, and switching transistors TR1, TR2 for primary driving, driven by a control circuit 1 to generate a push-pull output. The output of a secondary high-voltage coil L2 of the AC high-voltage transformer T1 is supplied, through an output terminal P1, to a separating charger constituting the load.

The other end of the secondary high-voltage coil of the high-voltage transformer T1 ms connected to a current control circuit consisting of, serial connection of a high-voltage diode D1 and a serial regulator 4, and also to a parallel circuit consisting of a high-voltage diode D2 and a resistor R12.

The serial regulator 4 is composed of serial connection of high-voltage transistors TR3, TR4 and serves to control the negative component of a separating corona current, which is the load current, by a variation in the base current of said transistor TR3 as will be explained later. A diode D2 is provided for bypassing the positive component in the opposite direction.

The resistor R12 determines the amount of negative component in the load current when the serial regulator 4 is cut off. Resistors R6, R7 of approximately equal resistances, which are sufficiently larger than that of the resistor R12, serve to divide the entire voltage across the serial regulator 4 substantially equal to the transistors TR3 and TR4.

Between the other ends of the serial regulator 4, resistor R12 and diode D2 and the ground, there is inserted a detection circuit 3 for detecting the DC component of the load current, consisting of parallel connection of a resistor R1 and a capacitor C1.

The voltage detected by the detection circuit 3 is compared with a reference voltage CR supplied to a terminal P2, by a differential amplifier 2, of which output controls the base current of the transistor TR3 in such a manner that the output of the detection circuit 3 becomes equal to the reference voltage VR.

The differential amplifier 2 is powered by a floating power source EF1. Since the other end of the floating power source EF1 is connected to the emitter of the transistor TR3, the base current thereof does not flow into the current detecting resistor R1.

The value of the resistor R12 is determined in the following manner.

Figure 17:
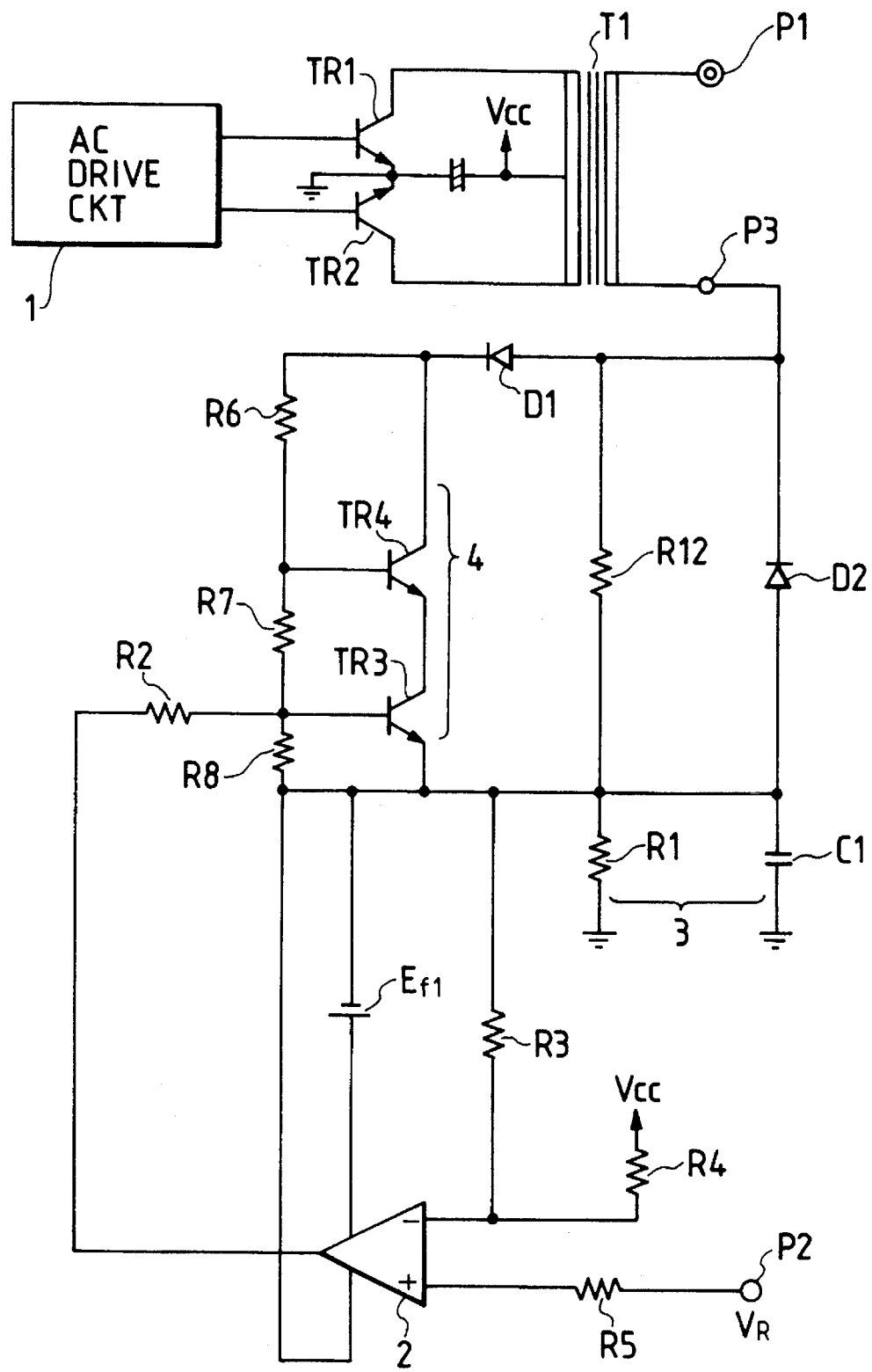
FIG. 17 is a circuit diagram of a 10th embodiment.
Figure 18:
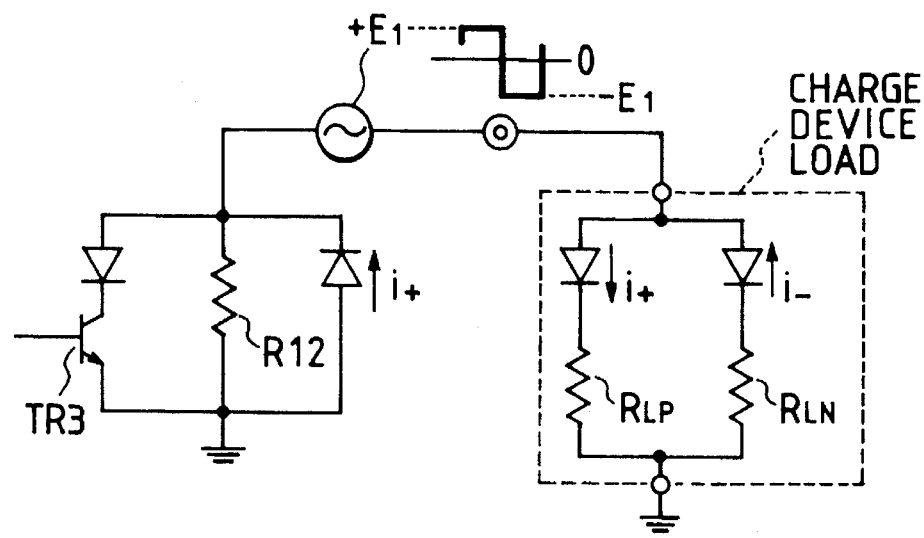
FIG. 18 is an equivalent circuit diagram of the power supply circuit of the 10th embodiment and a load charger.
Figure 19:
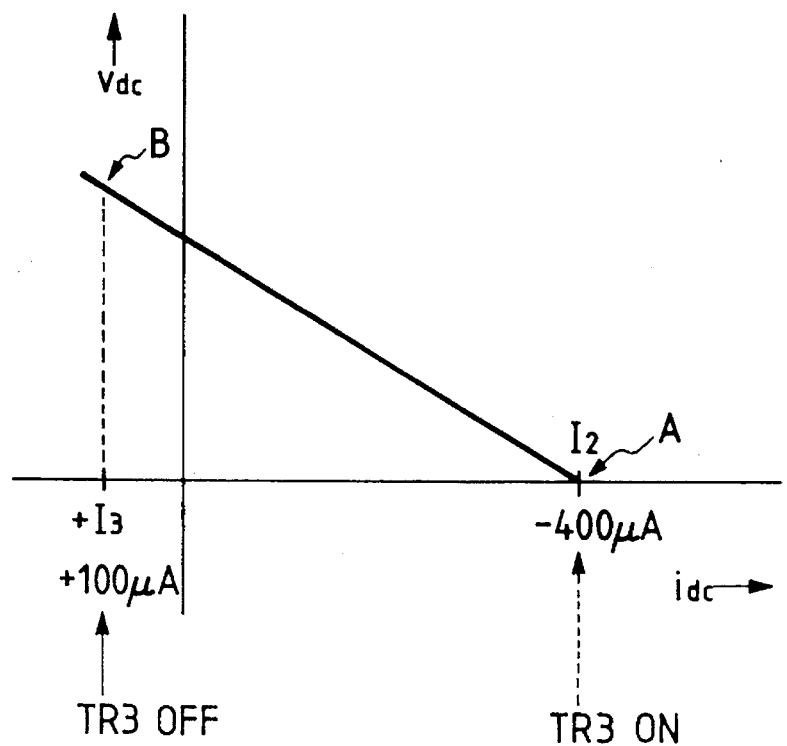
FIG. 19 is a voltage-current characteristic chart of the charger in the 10th embodiment.

FIG. 18 is a schematic equivalent circuit diagram of the power supply circuit of the 10th embodiment shown in FIG. 17 and the load charger, and FIG. 19 is a voltage-current characteristic chart of the DC component of the charger.

In FIG. 19, points A and B define the required control range of the DC component. Thus the transistor TR3 has to be turned on at the point A and off at the point B, and, in the turned-off state of the transistor TR3, the positive current has to be larger than the negative current by $I_3$. Thus $$V_1/R_{LP} - V_1/(R_{LN}+R_{12}) = I_3 \qquad (3)$$

wherein:

$V_1$: ½ of amplitude of AC high-voltage output $R_{LP}$: positive pseudo equivalent resistance of load charger $R_{LN}$: negative pseudo equivalent resistance of load charger Thus $R_{12}$ can be determined from the equation (3) in the following manner:

$$R12 = \frac{R_{LP}}{1-(I_3 R_{LP})/V_1} - R_{LN} \qquad (4)$$

The detection output of the DC component detection circuit 3 has to be shifted in level by resistors R3, R4 so as to fit into the input dynamic range of the differential amplifier 2.

Also the values of the resistors R3, R4 have to be sufficiently large, in order not to affect the precision of detection, since the current in the resistors R3, R4 also flows in the DC component detecting resistor R1.

The differential amplifier 2, constituting control means for controlling the bare current of the transistor TR3 of the serial regulator 4 according to the output of the detection circuit 3 for the DC component of the load current, is to have a sufficiently large input impedance, for a similar reason to that for the resistors R3, R4.

The above-explained configuration divides the secondary high-voltage current of the AC high-voltage transformer T1 into positive and negative DC currents by the diodes D1 and D2, and controls the DC component of the load current by the serial regulator 4 constituting the current control circuit, inserted in one of thus divided currents.

Also it can control the DC component of the load current over positive and negative regions, as the resistor R12, inserted parallel to the current control circuit, has a resistance larger than the difference between the positive and negative pseudo equivalent resistances of the load charger.

For achieving a wide-range control on the DC component of the load current, the output voltage of the serial regulator 4 in the current control circuit has to be variable over a wide range. Since the serial regulator 4 divides the applied voltage by serial connection of plural transistors TR3, TR4, it is not restricted by the breakdown voltage of respective transistor. Thus the DC component of the load current of the charger can be controlled over a wide range including positive and negative regions, by the control of base current of the transistor in the serial regulator 4 according to the result of comparison of the output of the detection circuit 3 with the reference voltage VR in the operational amplifier 2.

Also the configuration of the present embodiment is featured by a simpler structure and a lower power loss, in comparison with the conventional devices.

[11th embodiment]

Figure 20:
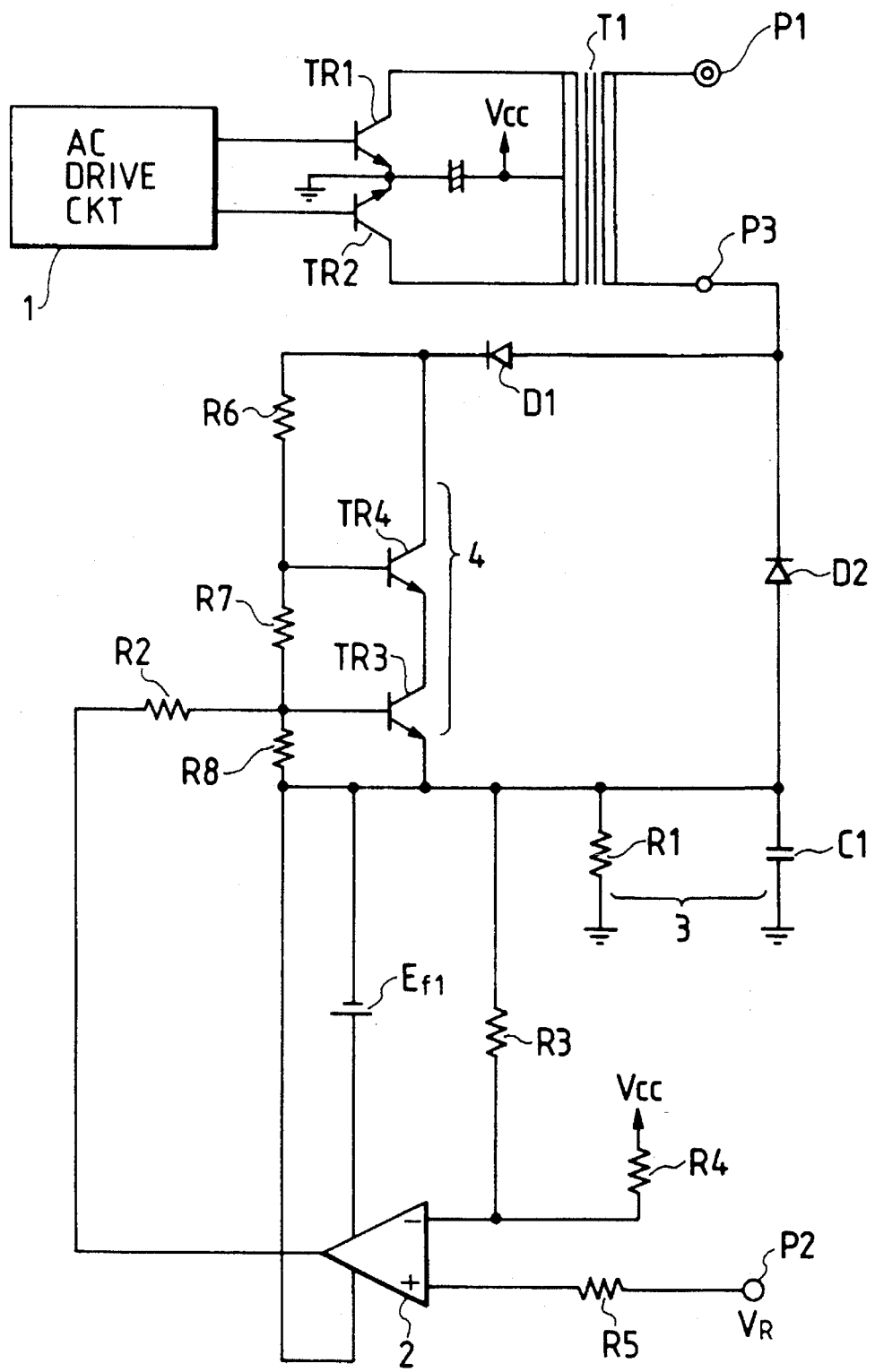
FIG. 20 is a circuit diagram of an 11th embodiment.

FIG. 20 is a circuit diagram of an 11th embodiment of the present invention, wherein parts same as or equivalent to those in the 10th embodiment are represented by same symbols and will not be explained further.

In the present embodiment, the resistors R6, R7 provided parallel to the serial regulator 4 are so selected that they have a summed resistance equal to the resistance of the resistor R12 in the 10th embodiment, thereby dispensing with said resistor R12.

The resistance of a resistor R8 provided between the base and the emitter of the transistor TR3 is selected sufficiently smaller than that of the resistors R6, R7 and can therefore be considered negligible.

In this manner there can be obtained an effect similar to that in the 10th embodiment.

[12th embodiment]

Figure 21:
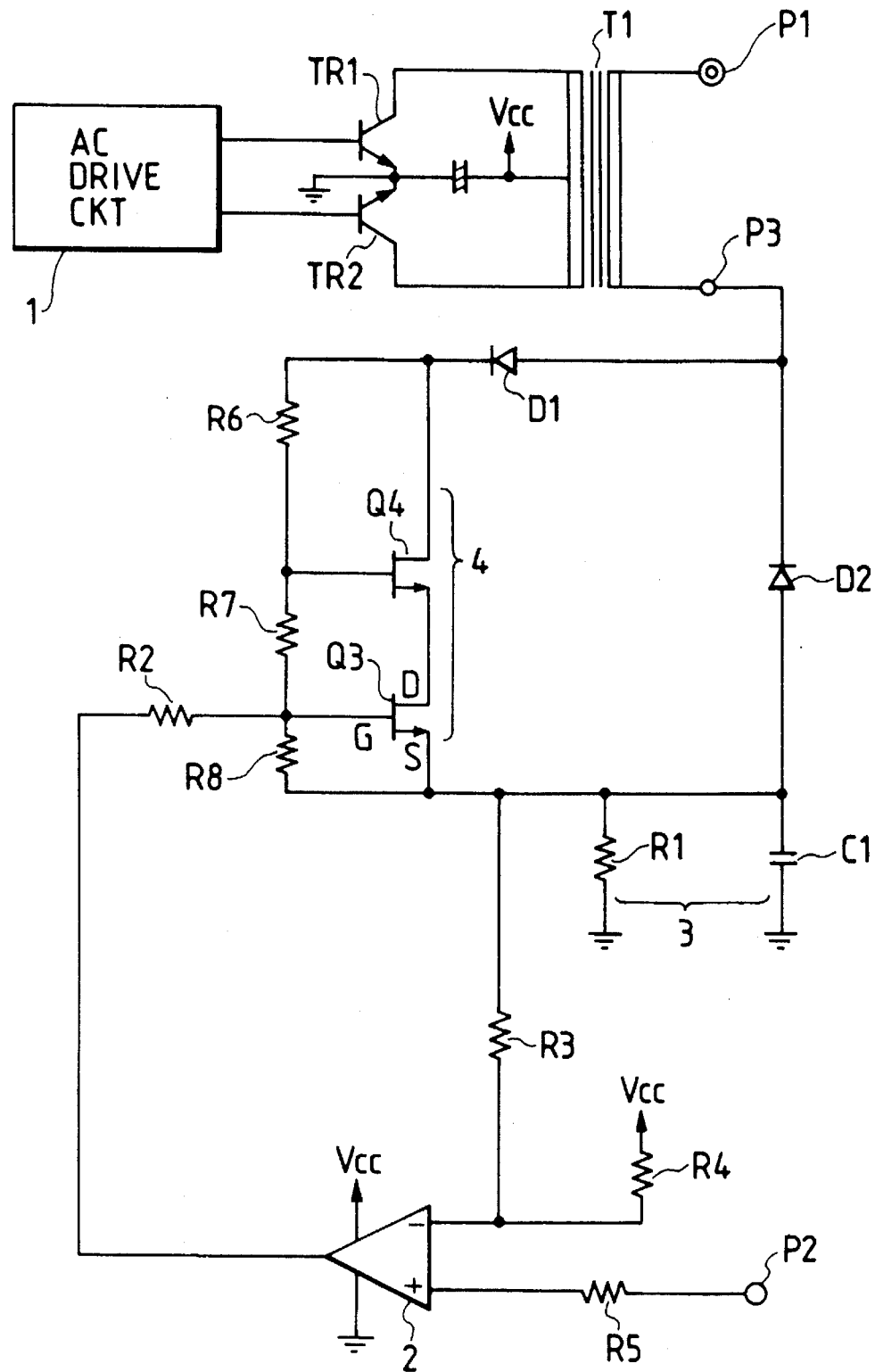
FIG. 21 is a circuit diagram of a 12th embodiment.

FIG. 21 is a circuit diagram of a 12th embodiment of the present invention, wherein parts same as or equivalent to those in the 10th embodiment are represented by same symbols and will not be explained further.

In the present embodiment, high-voltage field effect transistors (FET) Q3, Q4 are employed for the high-voltage transistors TR3, TR4 in the serial regulator 4.

The output of the differential amplifier 2 controls the gate voltage of the FET Q3. Since there is no current leak from the gate G to the source S or drain D, the power source for the differential amplifier 2 need not be in the floating state. Consequently the circuit structure is simplified, and still a same effect as in the 10th embodiment can be attained.

[13th embodiment]

Figure 22:
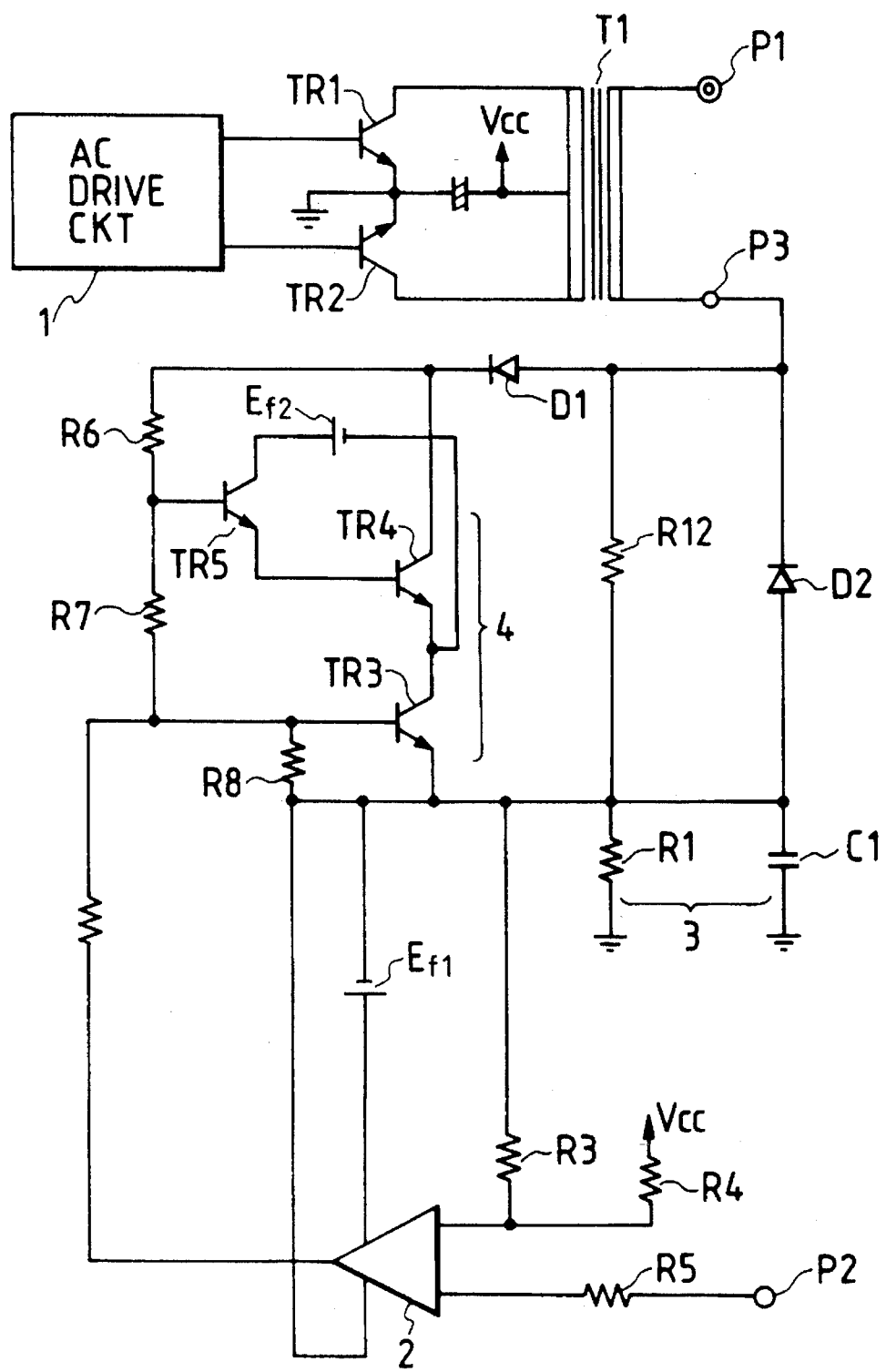
FIG. 22 is a circuit diagram of a 13th embodiment.

FIG. 22 is a circuit diagram of a 13th embodiment of the present invention, wherein parts same as or equivalent to those in the 12th embodiment are represented by same symbols and will not be explained further.

In the 10th and 11th embodiments, with an increase of the current in the serial regulator 4, the voltage thereacross becomes lower, and the base current of the transistor TR4 also decreases. Consequently the saturation voltage of the transistor TR4 becomes considerably high, and the control range of the DC component of the load current become limited.

For this reason, in the present embodiment, the potential at the junction of the resistors R6 and R7 is given to the base of the transistor TR4 through a transistor TR5 of emitter follower connection. The collector of the transistor TR5 is connected to a floating power source EF2, having the reference at the emitter of the transistor TR4.

Base resistors R6, R7 of the transistors TR3, TR4 have resistances in a range from several hundred ohms to several kilo-ohms for elevating the destruction voltages of said transistors.

Figure 23:
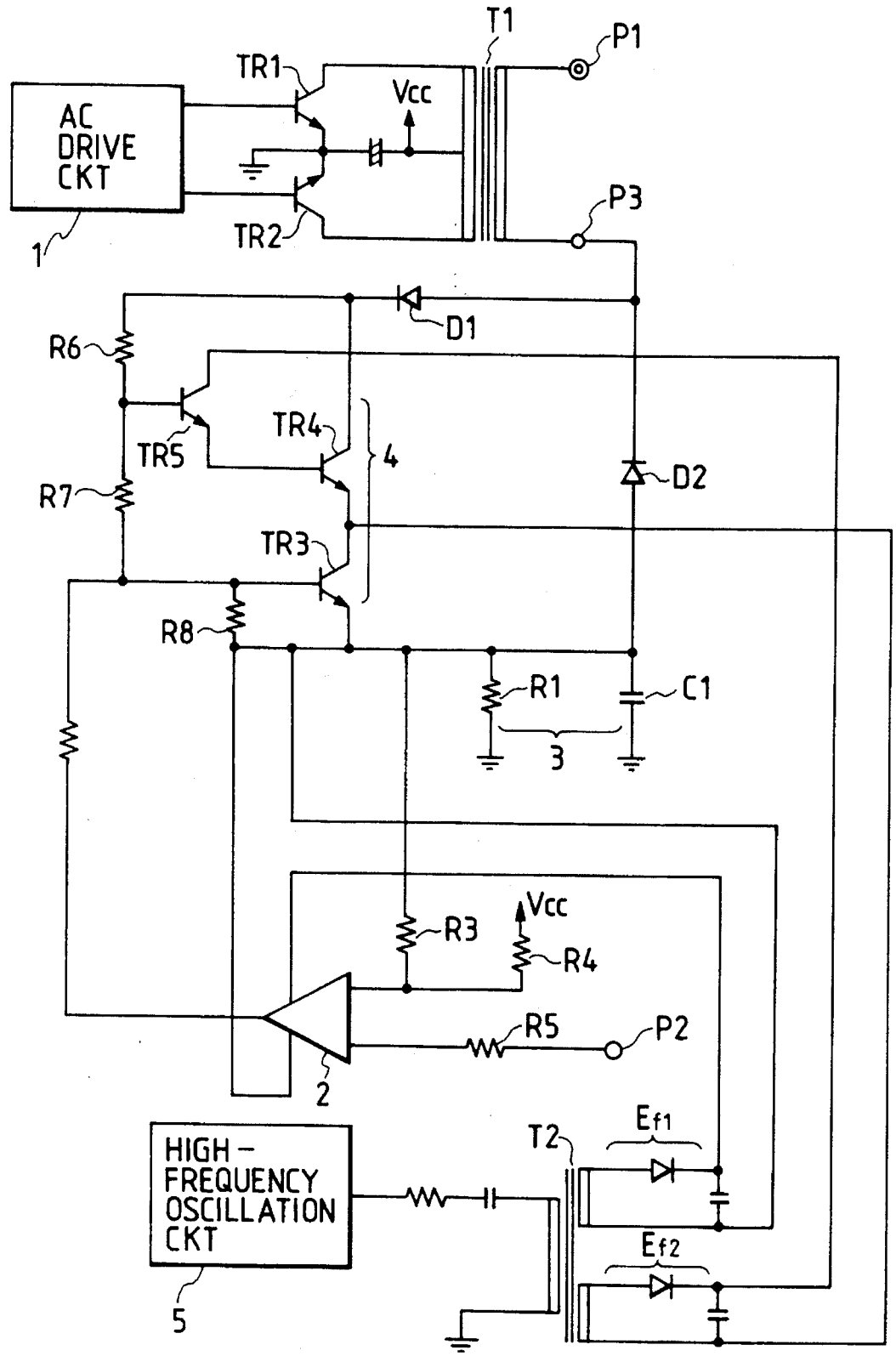
FIG. 23 is a circuit diagram showing an example of a floating power source in the 13th embodiment.

FIG. 23 illustrates an example of the floating power sources EF1, EF2 for the 13th embodiment.

A high frequency oscillator circuit 5 drives a pulse transformer T, the secondary output of which is rectified to provide a floating power source EF1 for the differential amplifier 2 and a floating power source for the emitter follower transistor TR5.

The above-explained configuration provides an effect similar to that in the 10th embodiment, without the limitation in the variable range of the load current resulting from the base current of the high-voltage transistors TR3, TR4 constituting the serial regulator 4.

[14th embodiment]

Figure 24:
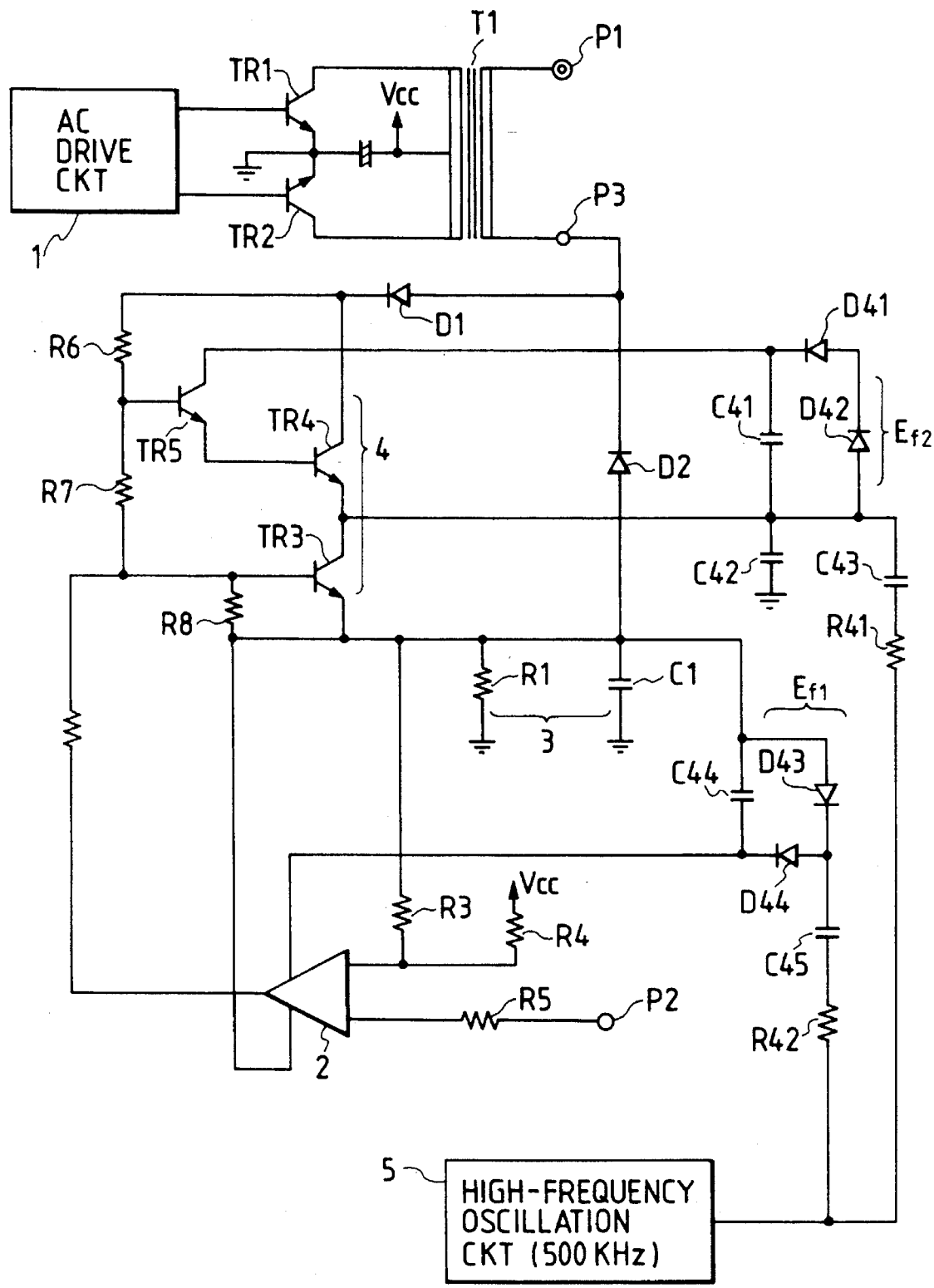
FIG. 24 is a circuit diagram of a 14th embodiment.

FIG. 24 is a circuit diagram of a 14th embodiment, wherein parts same as or equivalent to those in the foregoing embodiment are represented by same symbols and will not be explained further.

In this 14th embodiment, the floating power supplies EF1, EF2 are obtained, not from a pulse transformer but from a capacity-coupled rectifying circuit.

The output frequency of the oscillator circuit 5 is selected as high as possible, in order to minimize the coupling capacity between the rectifying circuit and the oscillator circuit. In the present embodiment, the oscillation frequency is selected as 500 KHz, and coupling capacitors C42, C43, C44 and C45 are selected as 100 pF.

The above-explained configuration provides an effect similar to that in the 13th embodiment, while reducing the cost of the floating power source and minimizing the attenuation of the AC high-voltage output.

As explained in the foregoing, the circuits of the 10th to 14th embodiments can control the DC component of the load current, by dividing the secondary high-voltage current of the AC high-voltage transformer into positive and negative DC currents by diodes, and inserting a current control circuit in one of thus divided currents.

Also the DC component of the load current can be controlled over a wide range including positive and negative regions, since the resistor positioned parallel to the current control circuit has a resistance larger than the difference between the positive and negative pseudo equivalent resistances of the load charger.

As the serial regulator is composed of serial connection of plural transistors, it is not limited by the breakdown voltage of respective transistor, and the DC component of the load current of the charger constituting the load can be controlled over a wide range, from positive to negative region, through the control of base current of the transistor constituting the serial regulator, according to the output of the detection circuit. Also the circuits of the embodiments are featured by a simpler structure and a lower power loss, in comparison with conventional circuits.

As explained in the foregoing, the present invention enables to vary the DC component of an AC output in a simple manner over a wide range including positive and negative regions.

The present invention is subject to various modifications within the scope and spirit of the appended claims. Although the present invention has been explained by a power supply device for use in a separating charger in an eletrophotographic copying machine or an eletrophotographic printer, it is likewise applicable also to other high-voltage generating devices releasing an output including a DC component machine or an electrophotographic printer, it is likewise applicable also to other high-voltage generating devices releasing an AC output including a DC component.

What is claimed is:

1. An AC high-voltage power supply circuit for use in an image forming apparatus including a load, comprising:

an AC high-voltage transformer to output AC high-voltage power;

a DC constant current circuit comprising a transistor, and being connected to said transformer in series;

a diode which is connected to said DC constant current circuit in parallel such that a current direction of said DC constant current circuit is opposite to that of said diode;

a constant voltage circuit which is connected in series to said DC constant current circuit and said transformer;

a load current detection circuit for detecting the DC component of a load current of the load; and a supply circuit for supplying composed voltage of an AC output of said AC high-voltage transformer and an output of said constant voltage circuit to the load without rectifying the AC output of said AC high-voltage transformer, wherein outputs of said constant voltage circuit and of said DC constant current circuit are controlled by an output of said load current detection circuit.

2. A power supply circuit according to claim 1, wherein said constant voltage circuit includes a DC-DC converter.

3. A power supply circuit according to claim 1, wherein said constant voltage circuit includes a tertiary coil provided at the secondary side of the AC high-voltage transformer and a shunt regulator including a rectifying circuit.

4. A power supply circuit according to claim 1, wherein there is a predetermined difference between the response speed of said constant voltage circuit and that of said DC constant current circuit.

5. An AC high-voltage generating device supplying a voltage to a load, comprising:

an AC high-voltage transformer;

an output terminal provided at a first end of the secondary coil of said AC high-voltage transformer;

a current control circuit comprising a serial circuit of a first diode and a transistor, a second diode opposite in direction to said first diode, and a resistor of a predetermined value, wherein said first diode, said second diode and said resistor are each connected in a parallel manner between a second end of said secondary coil and ground;

a detection circuit for detecting a DC component of a load current of the load;

a control unit for controlling said transistor according to an output of said detection circuit; and a supply circuit for supplying an AC output of said AC high-voltage transformer to the load without rectifying the AC output of said AC high-voltage transformer.

6. An AC high-voltage generating device according to claim 5, wherein said control unit includes:

a differential amplifier; and a power source for said differential amplifier, maintained in a floating state in such a manner that an operating current and output current of said differential amplifier do not flow into said detection circuit for a DC component of the load current.

7. An AC high-voltage generating device according to claim 5, wherein said control unit includes:

an emitter follower circuit; and a power source for said emitter follower circuit, maintained in a floating state in such a manner that the operating current and output current of said emitter follower circuit do not flow into said detection circuit for the DC component of the load current.

8. An AC high-voltage generating device according to claim 5, further comprising:

a detection circuit for detecting the AC component of the load current; and a circuit for deactivating a primary coil of said AC high-voltage transformer when the output of said detection circuit exceeds a predetermined value.

9. An AC high-voltage generating device according to claim 6, wherein said power source in a floating state includes a tertiary coil provided in said AC high-voltage transformer and provides electric power by rectifying and smoothing the output of said tertiary coil.

10. An AC high-voltage generating device according to claim 6, wherein said power source in a floating state provides electric power by generating an alternating current by an oscillator circuit and double-voltage rectifying said alternating current.

11. An AC high-voltage generating device according to claim 5, wherein said transistor is a field effect transistor.

12. A power supply circuit for use in an image forming apparatus, comprising:

a current control circuit comprising a first diode and plural transistors, wherein said first diode and said plural transistors are serially connected;

a second diode for passing a current opposite in direction to a current in said current control circuit; and a resistor, the resistance of which is larger by a predetermined value than a difference between positive and negative pseudo equivalent resistances of a charger constituting a load; said current control circuit, said second diode and said resistor being connected between a secondary coil of an AC high-voltage transformer and ground;

a detection circuit for detecting the DC component of a load current of the load; and control means for controlling a base of a transistor of said current control circuit according to the output of said detection circuit, wherein said control means includes a differential amplifier of a high input impedance adapted for comparing an output of said detection circuit inserted between said current control circuit and ground with a predetermined reference voltage and accordingly controlling a base current of a transistor positioned closest to ground among said plural transistors in said current control circuit, and wherein said differential amplifier is powered by a power source of a floating configuration in such a manner that the operating current and the output base current of said differential amplifier do not flow into said detecting resistor.

13. A power supply circuit according to claim 12, wherein the bases of said plural transistors of the current control circuit, excluding a base of the transistor closest to ground, are connected to voltage-dividing resistors through emitter follower circuits powered by a power source in a floating state.

14. A power supply circuit according to claim 12, wherein the power source in a floating state provides electric power by generating an alternating current by an oscillator circuit and double-voltage rectifying said alternating current.

15. A power supply circuit according to claim 12, wherein the power source in a floating state provides an electric power by rectifying the output of a tertiary coil provided on the AC high-voltage transformer.

16. An AC high-voltage power supply apparatus for use in an image forming apparatus including a load, comprising:

an AC high-voltage transformer to output AC high-voltage power and to supply an AC output to the load without rectifying the AC output;

a DC constant current circuit comprising a transistor which is connected to said transformer in series;

a diode element which is connected to said DC constant current circuit in parallel such that a current flowing direction of said diode element is opposite to that of said DC constant current circuit;

a load current detection circuit for detecting the DC component of a load current of the load; and a feedback control circuit for controlling said DC constant current circuit based on an output of said load current detection circuit.

17. An apparatus according to claim 16, further comprising a constant voltage circuit which is connected in series to said DC constant current circuit and said transformer.

18. An apparatus according to claim 17, wherein said feedback control circuit controls said DC constant voltage circuit based on the output of said load current detection circuit.

19. An apparatus according to claim 16, further comprising a register which is connected in parallel to said constant current circuit and to said diode element.

20. An apparatus according to claim 16, wherein said DC constant current circuit comprises a second diode whose direction is opposite to said diode element.

\* \* \* \* \*

UNITED STATES PATENT AND TRADEMARK OFFICE
CERTIFICATE OF CORRECTION

PATENT NO. : 5,532,913
DATED : July 2, 1996
INVENTOR(S) : KOJI SUZUKI ET AL.

Page 1 of 5

It is certified that error appears in the above-identified patent and that said Letters Patent is hereby corrected as shown below:

COLUMN 1

Line 23, "show" should read --shows--.
Line 42, "said" should read --the--.
Line 50, "breeder" should read --bleeder--.
Line 52, "400" should read -- -400--.
Line 53, "ride" should read --rise--.

COLUMN 2

Line 13, "from" should read --from the-- and "to" should read --to the--.
Line 49, "control;" should read --control--.
Line 56, "output;" should read --output--.

COLUMN 3

Line 20, "of" should read --of the-- and "in" should read --in the--.
Line 22, "Of" should read --of--.
Line 25, "in" should read --in the--.
Line 45, "the" should read --the thus--.
Line 54, "configuration,the" should read --configuration, the--.
Line 55, "transistor" should read --transistors--.
Line 57, "of" should read --of the--, and "transistor." should read --transistors.--.
Line 59, "from" should read --from the-- and "to" should read --to the--.
Line 60, "of" (1st occurrence) should read --of the--.

UNITED STATES PATENT AND TRADEMARK OFFICE
CERTIFICATE OF CORRECTION

PATENT NO. : 5,532,913
DATED : July 2, 1996
INVENTOR(S) : KOJI SUZUKI ET AL.

It is certified that error appears in the above-identified patent and that said Letters Patent is hereby corrected as shown below:

COLUMN 4

Line 7, "of" should read --of a--.
Line 8, "circuits;" should read --circuit;--.
Line 54, "10" should be deleted.

COLUMN 5

Line 52, "from" should read --from the-- and "to" should read --to the--.
Line 63, "cricuit" should read --circuit--.
Line 66, "represent" should read --represented--.

COLUMN 6

Line 42, "R2" should read --R21--.
Line 45, "Of" should read --On--.

COLUMN 7

Line 2, "from" should read --from the--.
Line 3, "to" should read --to the--.
Line 24, "Tr3," should read --TR3--.
Line 26, "Tr3," should read --TR3--.
Line 48, "of" (2nd occurrence) should be deleted.

UNITED STATES PATENT AND TRADEMARK OFFICE
CERTIFICATE OF CORRECTION

PATENT NO. : 5,532,913
DATED : July 2, 1996
INVENTOR(S) : KOJI SUZUKI ET AL.

Page 3 of 5

It is certified that error appears in the above-identified patent and that said Letters Patent is hereby corrected as shown below:

COLUMN 8

Line 17, "in" should read --in the--, and "called" should read --called the--.
Line 25, "of" should read --of the--.
Line 26, "ires" should read --is--.
Line 36, "Emitter" should read --emitter--.

COLUMN 9

Line 18, "ah" should read --an--.
Line 29, "to" should be deleted.
Line 35, "converter" should read --converter.--.
Line 41, "current voltage" should read --current and thereby deactivating the AC high-voltage--.
Line 46, "the" (2nd occurrence) should read --be--.
Line 51, "FIG. 7" should read --FIG. 17--.
Line 63, "ms" should read --is--.
Line 64, "of," should read --of--.

COLUMN 10

Line 25, "EF1." should read --Ef1.--.
Line 26, "EF1" should read --Ef1--.
Line 40, "Thus" should read --Thus:--.

UNITED STATES PATENT AND TRADEMARK OFFICE
CERTIFICATE OF CORRECTION

PATENT NO. : 5,532,913
DATED : July 2, 1996
INVENTOR(S) : KOJI SUZUKI ET AL.

Page 4 of 5

It is certified that error appears in the above-identified patent and that said Letters Patent is hereby corrected as shown below:

COLUMN 11

Line 6, "of" should read --of the--.
Line 17, "of" should read --of the--, and "transistor." should read --transistors.--.
Line 20, "of" (1st occcurrence) should read --of the--.
Line 31, "by" should read --by the--.
Line 36, "Said" should read --said--.
Line 50, "by" should read --by the--.
Line 66, "by" should read --by the--.

COLUMN 12

Line 10, "of" (2nd occurrence) should read --of the--.
Line 12, "EF2," should read --Ef2--.
Line 19, "EF1, EF2" should read --Ef1, Ef2--.
Line 22, "EF1" should read --Ef1--.
Line 36, "by" should read --by the--.
Line 38, "EF1," should read --Ef1,--.
Line 39, "EF2" should read --Ef2--.
Line 56, "of" should read --of the--.
Line 66, "of" should read --of the-- and "transistor," should read --transistors,--.

UNITED STATES PATENT AND TRADEMARK OFFICE
CERTIFICATE OF CORRECTION

PATENT NO. : 5,532,913
DATED     : July 2, 1996
INVENTOR(S): KOJI SUZUKI ET AL.

It is certified that error appears in the above-identified patent and that said Letters Patent is hereby corrected as shown below:

COLUMN 13

Line 2, "of" should read --of the--.
Line 7, "foregoing,the" should read --foregoing, the--.
Line 8, "to vary" should read --varying of--.
Line 16, "applicable also to other high-voltage generating" should be deleted.
Line 17, "devices releasing an output including a DC component" should be deleted.
Line 18, "machine or an electrophotographic printer, it is likewise" should be deleted.

COLUMN 15

Line 20, "an" should be deleted.

Signed and Sealed this

Seventeenth Day of December, 1996

Attest:

BRUCE LEHMAN

*Attesting Officer*      *Commissioner of Patents and Trademarks*